US010258884B2

(12) United States Patent
Lemer

(10) Patent No.: US 10,258,884 B2
(45) Date of Patent: Apr. 16, 2019

(54) APPROXIMATED DIFFUSE LIGHTING FOR A MOVING OBJECT

(71) Applicant: Zynga Inc., San Francisco, CA (US)

(72) Inventor: Benjamin Lemer, Eugene, OR (US)

(73) Assignee: Zynga Inc., San Francisco, CA (US)

( * ) Notice: Subject to any disclaimer, the term of this patent is extended or adjusted under 35 U.S.C. 154(b) by 185 days.

(21) Appl. No.: 14/627,942

(22) Filed: Feb. 20, 2015

(65) Prior Publication Data

US 2015/0290539 A1 Oct. 15, 2015

Related U.S. Application Data

(60) Provisional application No. 61/977,562, filed on Apr. 9, 2014.

(51) Int. Cl.

| A63F 13/52 | (2014.01) |
|---|---|
| A63F 13/92 | (2014.01) |
| A63F 13/573 | (2014.01) |
| A63F 13/5258 | (2014.01) |
| G06T 15/50 | (2011.01) |

(52) U.S. Cl.
CPC .......... *A63F 13/52* (2014.09); *A63F 13/5258* (2014.09); *A63F 13/573* (2014.09); *A63F 13/92* (2014.09); *G06T 15/506* (2013.01)

(58) Field of Classification Search
None
See application file for complete search history.

(56) References Cited

U.S. PATENT DOCUMENTS

| 5,710,876 | A | 1/1998 | Peercy et al. |
| 6,667,741 | B1 * | 12/2003 | Kataoka ................ G06T 15/50 |
| | | | 345/426 |
| 7,783,729 | B1 | 8/2010 | Macaluso |
| 8,369,795 | B2 | 2/2013 | Glaser et al. |
| 2005/0248571 | A1 | 11/2005 | McTaggart |

(Continued)

OTHER PUBLICATIONS

Occlusion Culling Algorithms by Eric Haines, Tomas Möller published on (http://www.gamasutra.com/view/feature/3394/occlusion_culling_algorithms.php?print=1) as archived from Nov. 10, 2011.*

(Continued)

*Primary Examiner* — James S McClellan
*Assistant Examiner* — Peter Iannuzzi
(74) *Attorney, Agent, or Firm* — Penilla IP, APC

(57) ABSTRACT

Systems and methods for performing approximated diffuse lighting are described. One of the methods includes receiving a position and orientation of a moving object in a frame, which includes a game space of a game. The method further includes receiving a first irradiance attribute imparted by a first light source to at least a portion of the moving object. The first irradiance attribute is generated based on the position and orientation. The method further includes receiving a second irradiance attribute imparted by a second light source to at least the portion of the moving object. The second irradiance attribute is generated based on the position and orientation. The method includes applying a statistical operation to the first irradiance attribute and the second irradiance attribute to generate a combined attribute and generating a rendered attribute for the moving object based on the combined attribute.

28 Claims, 24 Drawing Sheets

(56) References Cited

U.S. PATENT DOCUMENTS

| | | | |
|---|---|---|---|
| 2006/0041657 A1 | 2/2006 | Wen et al. | |
| 2006/0284868 A1* | 12/2006 | Ahn | G01C 21/3638 345/419 |
| 2007/0077960 A1 | 4/2007 | Jain et al. | |
| 2011/0063297 A1* | 3/2011 | Toyama | G06T 15/503 345/426 |
| 2012/0299922 A1* | 11/2012 | Ha | G06T 15/506 345/426 |
| 2013/0005458 A1* | 1/2013 | Kosta | G07F 17/3206 463/31 |

OTHER PUBLICATIONS

Green, Robin, "Spherical Harmonic Lighting: The Gritty Details", Jan. 16, 2003, 47 pages.
"Vertex Lit Rendering Path Details", Sep. 9, 2010, 1 page, UNITY.
Cupisz, Robert, "Light probe interpolation using tetrahedral tessellations", Mar. 5-9, 2012, 53 pages, Game Developers Conference 2012, San Francisco, CA, USA.
"Hardware Requirements for Unity's Graphics Features", Nov. 16, 2012, 1 page, UNITY.
"Forward Rendering Path Details", Mar. 19, 2013, 2 pages, UNITY.
"Deferred Lighting Rendering Path", Aug. 28, 2013, 2 pages, UNITY.
"Spherical harmonic lighting", Aug. 2, 2013, 1 page, Wikipedia.
Legarde, Sebastien and de Rousiers, Charles, "Moving Frostbite to Physically Based Rendering", 2014, 119 pages.
Cupisz, Robert, "Unity Technologies Blog, Blog Archive, Light Probes", Mar. 9, 2011, pp. 1-19. Retrieved from the Internet: URL:https://web.archive.org/web/20120328104849/http://blogs.unity3d.com/2011/03/09/light-probes/.
Tatarchuk, Natalya, "Irradiance Volumes for Games",Game Developers Conference Europe, 2005, pp. 1-59. Retrieved from the Internet: URL:https://web.archive.org/web/20130319033053/http://developer.amd.com/wordpress/media/2012/10/Tatarchuk Irradiance Volumes.pdf.
PCT/US2015/024849 International Search Report and Written Opinion, dated Jul. 29, 2015, 13 pages.

* cited by examiner

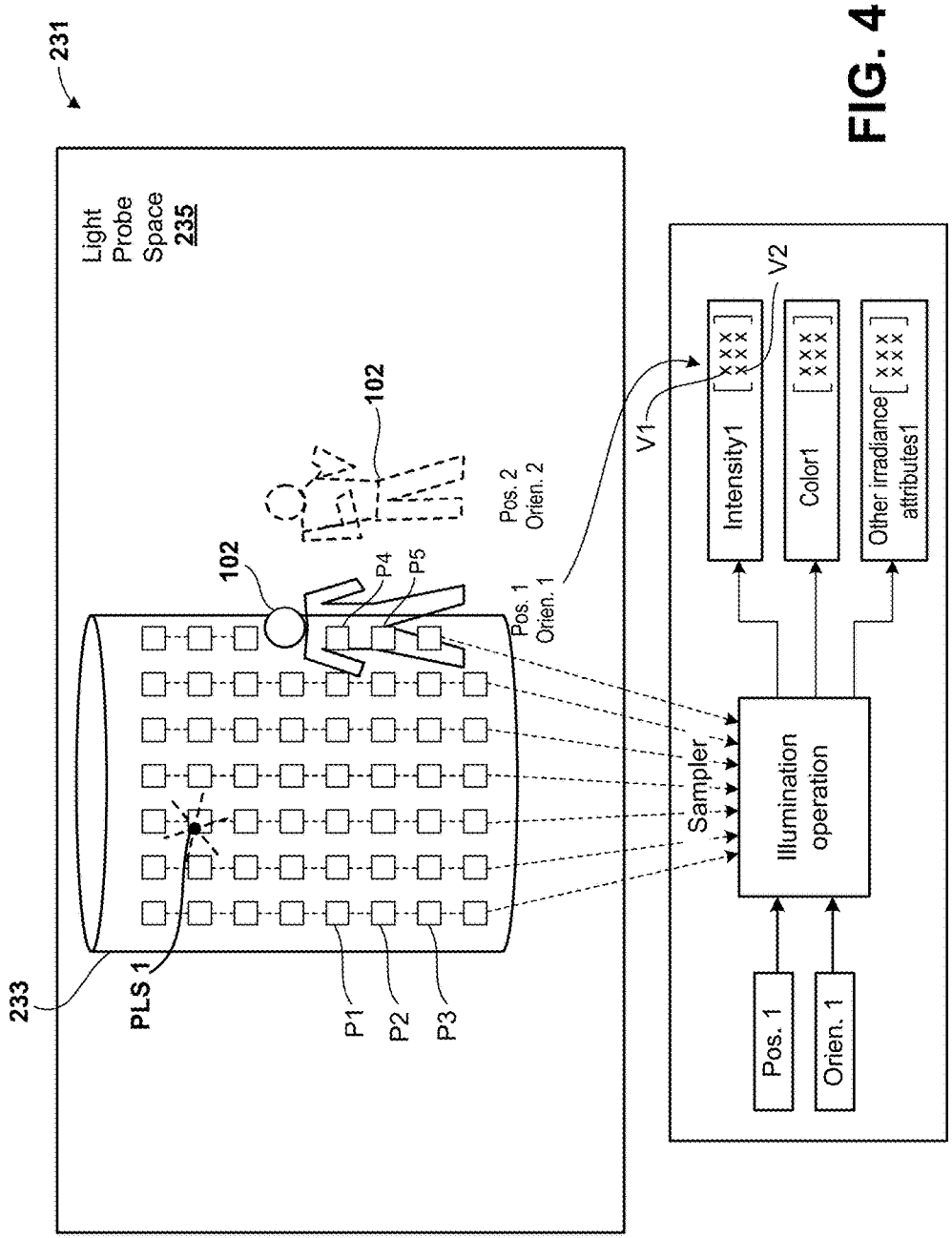

Rendered attribute of moving object at a position and orientation in a frame = emissive color (texture color of moving object w/o effect from any light source) + (2x color lookup prgb-1) × Irradiance attribute from illumination operation × weighted attribute rgb is scaled from 0 to 1 to -1 to 1

APPROXIMATED DIFFUSE LIGHTING FOR A MOVING OBJECT

CLAIM OF PRIORITY

This application claims the benefit of and priority to, under 35 U.S.C. 119§ (e), to U.S. Provisional Patent Application No. 61/977,562, filed on Apr. 9, 2014, and titled "Approximated Diffuse Lighting for a Moving Object", which is hereby incorporated by reference in its entirety.

FIELD OF THE INVENTION

The present disclosure relates to approximated diffuse lighting for a moving virtual object.

BACKGROUND

With the advancement of the Internet, a large number of users are playing games online. The games are fun and challenging. They keep a user engaged for a long period of time.

Some games allow a user to build a virtual object, e.g., a virtual city, a virtual restaurant, a virtual village, a virtual farm, etc. The user is engaged in playing a game. For example, the user collects rent from a building of the virtual city, grows virtual crops on the farm to sell to his/her gaming network friends, and/or fights a battle in the virtual village.

The game is accessed by the user on a cell phone or a smart phone from a server. During the play of the game, it is beneficial to enhance graphics associated with the virtual object quickly and efficiently.

It is within this context that embodiments described in the present disclosure arise.

SUMMARY

Embodiments described in the present disclosure provide systems and methods for providing approximated diffuse lighting for a virtual object.

In some embodiments, multiple light sources that emit light to be incident on a virtual object are combined to form a combined light source. The combined light source emits light that is a combination of light that is emitted from the multiple light sources. The light from the combined light source affects an intensity of the virtual object as the moving virtual object changes its position and/or orientation in a game scene. This combining of the multiple light sources allows a rendering computer software program to recalculate an intensity of light as the virtual object moves from one position to another and/or as the virtual object changes its orientation. The combining and rendering associated with the combined light source is advantageous over rendering multiple intensities of light that is emitted by the multiple light sources. The rendering of the multiple intensities takes several passes of a rendering operation, one pass for each light source and for each position of the virtual object. Comparatively, the rendering for the combined light source takes one pass of a rendering operation for the combined light source and for each position of the virtual object. In some embodiments, a processor of a mobile device is capable of performing the rendering for the combined light source.

Moreover, the rendering operation for the combined light source includes a low number of arithmetic operations. In some embodiments, a processor of a mobile device is capable of performing the arithmetic operations.

In some embodiments, a method for performing approximated diffuse lighting includes receiving a position and orientation of a moving object in a frame, which includes a game space of a game. The method further includes receiving a first irradiance attribute imparted by a first light source to at least a portion of the moving object. The first irradiance attribute is generated based on the position and orientation. The method further includes receiving a second irradiance attribute imparted by a second light source to at least the portion of the moving object. The second irradiance attribute is generated based on the position and orientation. The method includes applying a statistical operation to the first irradiance attribute and the second irradiance attribute to generate a combined attribute and generating a rendered attribute for the moving object based on the combined attribute.

In various embodiments, a method includes sending for display a moving object in a game on a computing device. The moving object is displayed at a first position. The method includes determining whether the moving object has moved to a second position from the first position and changing a rendered intensity of light incident on the moving object in response to determining that the moving object has moved from the first position to the second position. The moving object is associated with a combined light source when the moving object is at the first position and when the moving object is at the second position. The combined light source combines light intensities from multiple light sources to generate the light.

In some embodiments, a method includes sending for display a moving object in a game on a mobile device. The moving object is displayed at a first orientation. The method further includes determining whether the moving object has changed to a second orientation from the first orientation and changing a rendered intensity of light incident on the moving object in response to determining that the moving object has changed from the first orientation to the second orientation. The moving object is associated with a combined light source when the moving object is at the first orientation and when the moving object is at the second orientation. The combined light source combines light intensities from multiple light sources.

In several embodiments, a method includes identifying whether a moving object is within a frustum of a camera, calculating a first position and orientation associated with the moving object in response to determining that the moving object is within the frustum, and determining whether the moving object is affected by a first light source or a second light source in response to determining the position and orientation of the moving object. The method includes identifying a first irradiance attribute imparted by the first light source to the moving object in response to determining that the moving object is affected by the first light source. The first irradiance attribute is generated based on the position and orientation. The method includes identifying a second irradiance attribute imparted by a second light source to the moving object in response to determining that the moving object is affected by the second light source. The second irradiance attribute is generated based on the position and orientation. The method includes applying a statistical operation to the first irradiance attribute and the second irradiance attribute to generate a combined attribute and generating a rendered attribute for at least a portion of the moving object based on the combined attribute.

Some advantages of the herein described systems and methods for performing approximated diffuse lighting include achieving high fidelity with little overhead. For example, a graphical processing unit (GPU) performs one multiplication operation per pixel or vertex for a position of a virtual moving object. As another example, a graphical processing unit (GPU) performs one multiplication operation per pixel or vertex for an orientation of a virtual moving object. Other advantages include that a point light source supports an arbitrary orientation, so that a moving virtual object is lit from any orientation. Multiple such point light sources are combined to form the combined light source. The combination of the point light sources saves processing time and costs associated with processing. Instead of performing a rendering operation for each point light source, a rendering operation is performed for the combined light source. This saves processing power, processing time, and processor cost. Moreover, the rendering operation for the combined light source is capable of being performed by a processor of a mobile device quickly and efficiently.

Other aspects described in the present disclosure will become apparent from the following detailed description, taken in conjunction with the accompanying drawings, illustrating by way of example the principles of various embodiments described in the present disclosure.

BRIEF DESCRIPTION OF THE DRAWINGS

Various embodiments described in the present disclosure may best be understood by reference to the following description taken in conjunction with the accompanying drawings in which:

FIG. 4 is a diagram of a system to illustrate obtaining irradiance attributes associated with a virtual object, in accordance with one embodiment described in the present disclosure.

DETAILED DESCRIPTION

It should be noted that various embodiments described in the present disclosure may be practiced without some or all of these specific details. In other instances, well known process operations have not been described in detail in order not to unnecessarily obscure various embodiments described in the present disclosure.

Figure 1:
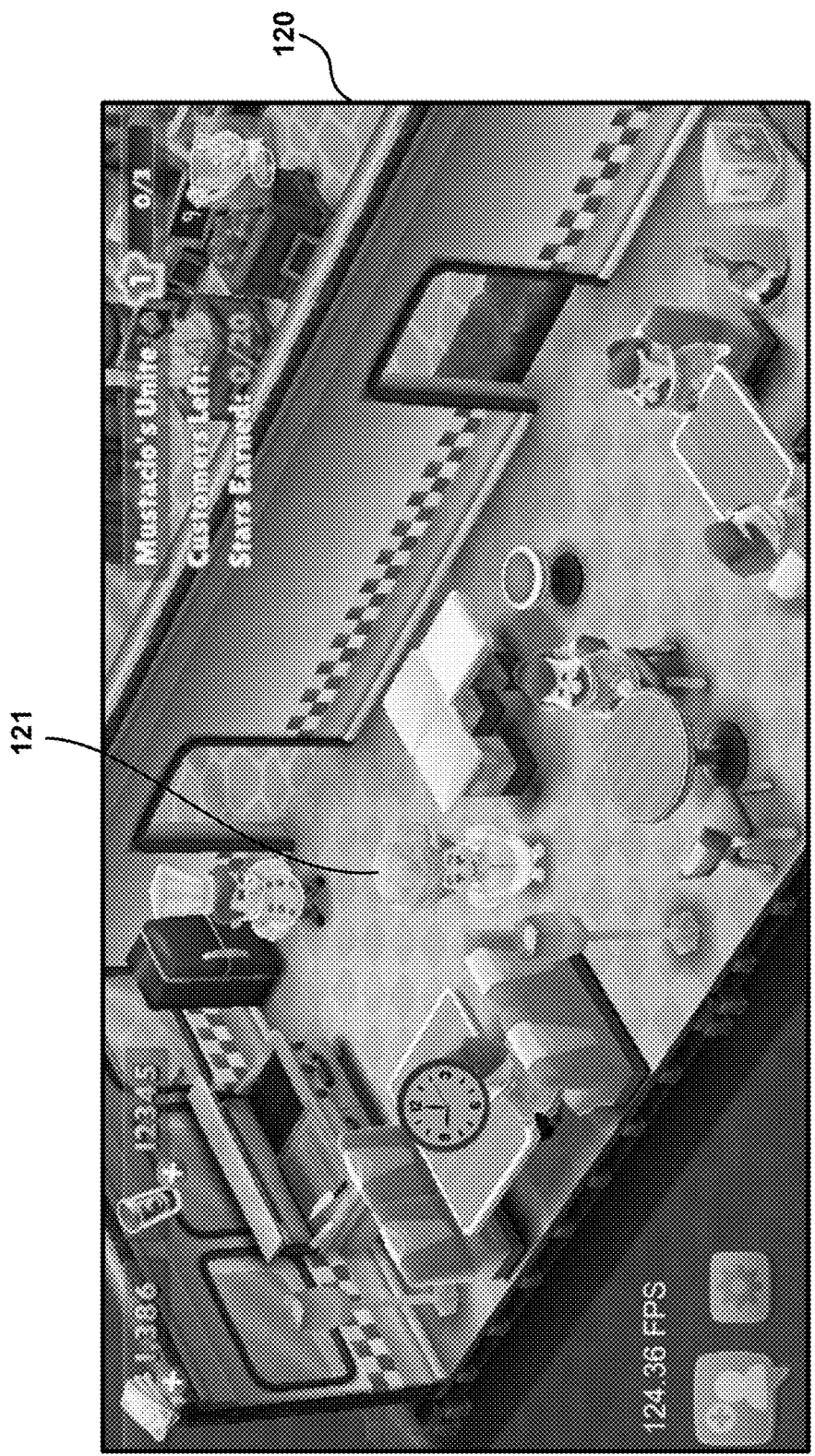
FIG. 1 is view of a game that is played without using approximated diffuse lighting, in accordance with one embodiment described in the present disclosure.

FIG. 1 is view of an embodiment of a game 120 that is played without using approximated diffuse lighting. The game 120 is accessed via a user account of a user, e.g., an entity, a person, etc. For example, the game 120 is accessed when the user logs into to the user account. The user logs into the user account when an authentication server authenticates information regarding the user, e.g., a user name, a password, etc.

In some embodiments, the game 120 is accessed after logging into a social network and a user account is a part of the social network. The social network is accessed via a social network service, which is provided by an entity, e.g., an organization, a corporation, etc. The social networking service is a platform to build social relations among people who, for example, share interests, activities, backgrounds, or real-life connections. The social networking service provides a representation, e.g., a profile, an image, a name, identification, etc., of each user when the user logs into the user account. Most social network services are web-based and provide mechanisms, e.g., e-mail, instant messaging, etc., for users to interact over the Internet. The social network service provides a social networking website that allows users to share ideas, pictures, posts, activities, events, and/or interests with other users in their network.

In various embodiments, the game 120 is accessed after logging into a gaming network and a user account is a part of the gaming network. The gaming network is managed by one or more entities to offer online multimedia games to players. The online multimedia games are accessed by logging into the user account and typically feature single player or multiplayer game play mechanics.

In various embodiments, the game 120 is implemented as a browser game on a desktop computer or a laptop computer or a mobile device, e.g., a tablet, a cell phone, a smart phone, etc. In a variety of embodiments, a laptop computer is a mobile device.

In the game 120, the user runs his/her/its virtual restaurant. A virtual user 121 that represents the user in the game 120 prepares and serves virtual food to virtual customers. The user is able to customize a décor of the virtual restaurant and to install beautiful cooking appliances for the virtual restaurant's kitchen. The user is able to pick styles for tables in the virtual restaurant, flooring of the virtual restaurant, and countertops of the virtual restaurant. The user is able to build relationships with virtual vendors of virtual food of the virtual restaurant and visit rival virtual restaurants to sample competitive food. The virtual user 121 moves around in the virtual restaurant of the game 120 for a variety of reasons, e.g., to cook virtual food, to serve virtual customers, to greet customers, etc. It should be noted that in the game 120, there is a lack of shading on moving objects, e.g., virtual users, etc., of the game 120.

Although the game 120 is illustrated as a chef game, in some embodiments, the game 120 is any other type of game, e.g., a farm game, a poker game, a city game, a crime game, a knights game, etc. In the farm game, the user creates, personalizes, and runs his/her/its own farm where virtual crops are grown and fed to a variety of animals. In the farm game, beautiful trees, bountiful crops, and adorable animals grow wild. In the poker game, a virtual poker lobby is created and buy-ins are offered that suit every wallet. Winners of the poker game share prizes, e.g., real money, virtual currencies, points, etc. In the city game, the user builds a virtual city, works in the city, and populates the city with social network friends. The virtual city includes businesses, streets, parks, public works, and/or schools. The user is also able to collect virtual rent from various businesses in the virtual city and shop at virtual shops in the virtual city. In the crime game, the user is a virtual cop, who polices a virtual city filled with corruption. The virtual cop is able to see spirits of the dead, find hidden objects, uncover evidence, play with social network friends to advance cases faster, and/or solve murders. The knights game allows the user to engage in a player-to-player virtual combat with his/her/its social network friends, allows the user to craft virtual equipment, and recruit virtual heroes.

Figure 2:
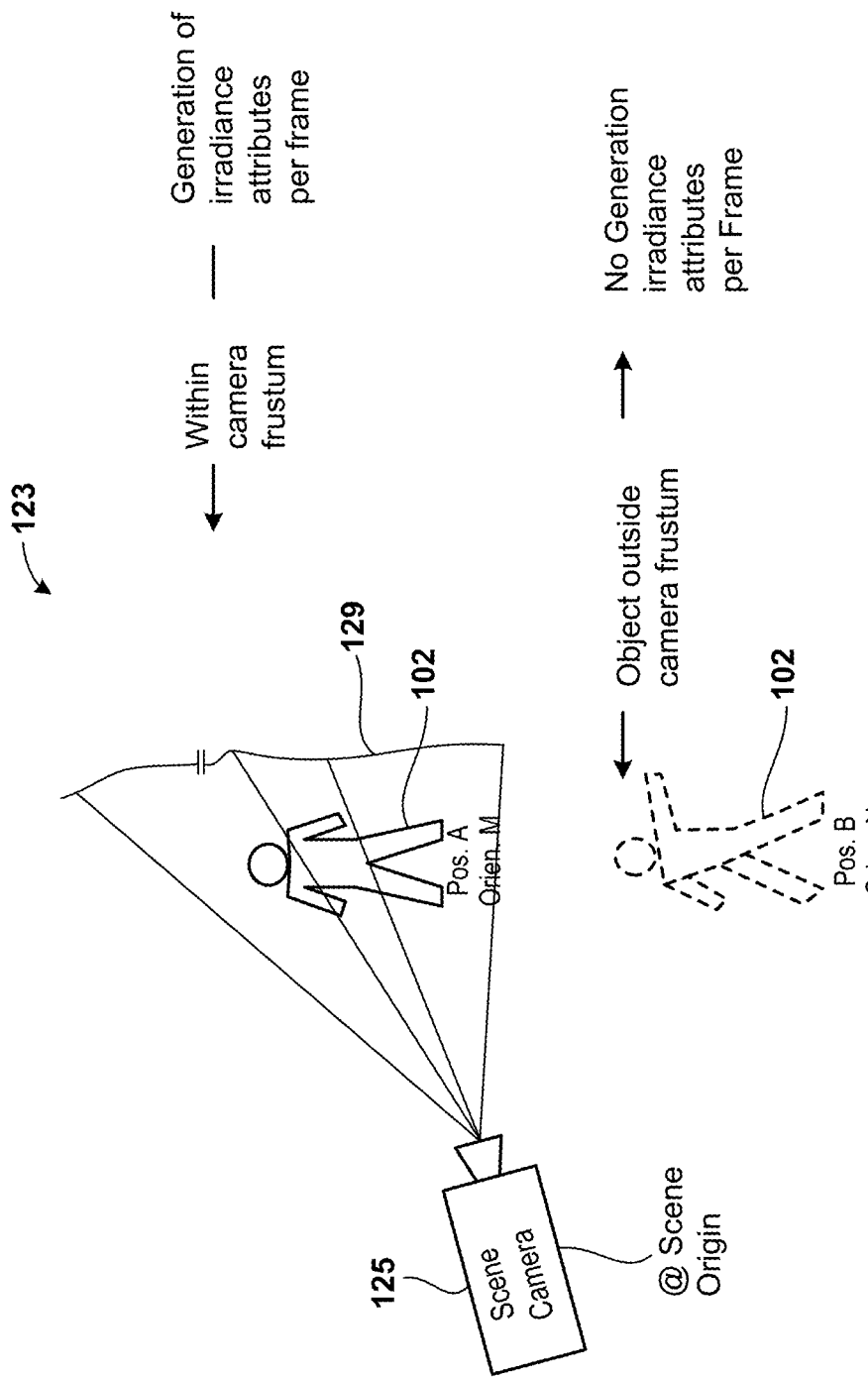
FIG. 2 is a diagram of a system for illustrating a generation of irradiance attributes based on whether a virtual object is within a frustum of a scene camera, in accordance with another embodiment described in the present disclosure.

FIG. 2 is a diagram of an embodiment of a system 123 for illustrating a dependence of generation of irradiance attributes on whether a virtual object is within a frustum 129 of a scene camera 125. The scene camera 125 is located at a scene origin of a game space. Examples of a virtual object include a virtual user 102, a virtual chef, a virtual farmer, a virtual poker player, a virtual animal, a virtual nonliving thing, a virtual item, a virtual table, a virtual household item, a virtual city location, a virtual street, a virtual tree, a virtual forest, etc. The virtual user 121 (FIG. 1) is an example of the virtual user 102.

The scene camera 125 provides an isometric view of a gaming environment of the game 120. For example, an image of the game 120 that is displayed on a display device, e.g., a liquid crystal display (LCD) device, a plasma display device, a light emitting diode (LED) display device, etc., is the same as that viewed by the user from a viewing lens of the scene camera 125. The scene camera 125 is placed at the scene origin to obtain the isometric view, e.g., a top down view, a bottom up view, a side left view, a side right view, etc., of a game.

The scene camera 125 has the frustum 129, e.g., a range, a game space, a scene, a gaming environment, etc., in which virtual objects are displayed within the game 120. When a virtual object moves, e.g., walks, runs, travels, slides, etc., from being within the frustum 129 to being outside the frustum 129, the virtual object is no longer visible in an image of the game 120. For example, when the virtual user 102 is at a position A and has an orientation M, the virtual user 102 is within the frustum 129. On the other hand, when a virtual object moves from being outside the frustum 129 to being within the frustum 129, the virtual object becomes visible in an image of the game 120. For example, when the virtual user 102 is at a position B and has an orientation N, the virtual user 102 is outside the frustum 129.

In some embodiments, a position includes an orientation. A position and an orientation of a virtual object within a space is measured with respect to a reference point, e.g., co-ordinates (0, 0, 0), the scene origin, etc., in the space.

In several embodiments, a position of a virtual object is a location of the virtual object within a co-ordinate system of a space in which the virtual object is located. For example, a position of a virtual object is measured by co-ordinates (x, y, z). In various embodiments, an orientation of a virtual object is a rotation of the virtual object with respect to an x-axis, a y-axis, and a z-axis of a co-ordinate system of a space in which the virtual object is located. For example, an orientation is determined in terms of roll, pitch, and yaw.

When it is determined by a processor that a virtual object is visible within the frustum 129 for a moving picture frame, irradiance attributes for the virtual object are generated by the processor for the moving picture frame, which is further described below. On the other hand, when it is determined by a processor that a virtual object is outside the frustum 129 of the scene camera 125 for a moving picture frame, irradiance attributes for the virtual object are not generated by the processor for the moving picture frame. Examples of irradiance attributes include color, intensity, shading, texture, etc. Examples of shading include dark shading, bright shading, etc. Examples of colors include red, green, blue, yellow, etc. In some embodiments, white is not a color. In various embodiments, white is a color.

As used herein, a processor includes a central processing unit (CPU), or a microprocessor, or an application specific integrated circuit (ASIC), or a programmable logic device (PLD), or a combination thereof. A processor is located within a mobile device or a desktop computer or a laptop computer or a server or a virtual machine.

In some embodiments, any operations described herein as being performed by a processor are performed by a combination of multiple processors within a combination of a mobile device or an immobile device, e.g., a desktop computer, a server, or a virtual machine.

In several embodiments, irradiance attributes are generated on a frame-by-frame basis. For example, irradiance attributes are generated for moving picture frames, e.g., images, etc., in which a virtual object is visible and are not generated for moving frames in which the virtual object is not visible. In some embodiments, a moving picture frame is composed of picture elements. In a moving picture, a number of frames per second is a frame rate. The higher the frame rate, the better the sense of motion.

Figure 3:
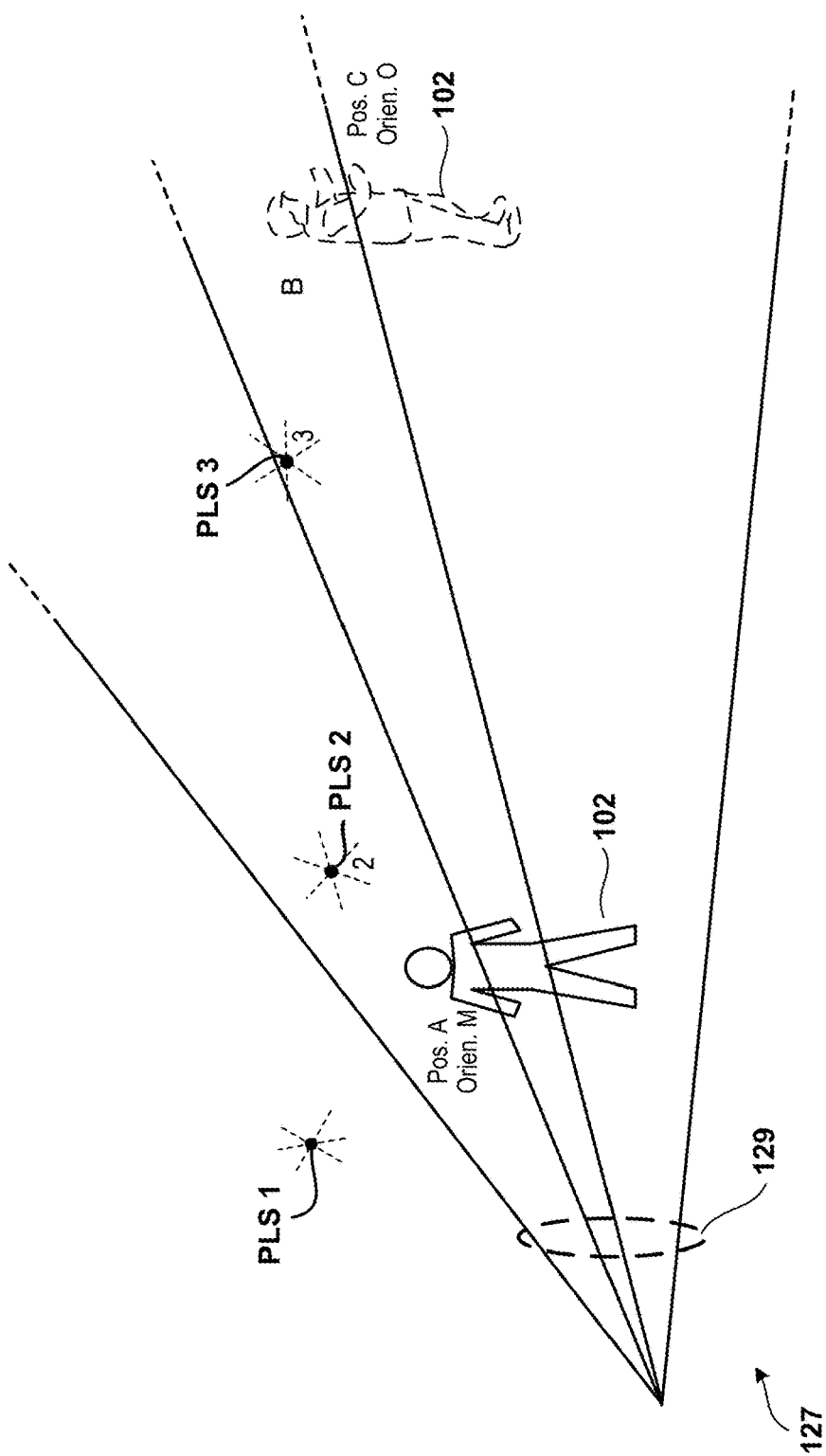
FIG. 3 is a diagram of a system for illustrating that irradiance attributes are generated for a virtual object that is illuminated by one or more point light sources, in accordance with one embodiment described in the present disclosure.

FIG. 3 is a diagram of an embodiment of a system 127 for illustrating that irradiance attributes are generated for a virtual object that is illuminated by one or more point light sources. A number of point light sources, e.g., a point light source 1, a point light source 2, a point light source 3, etc., are generated by a processor within the frustum 129 of the game 120.

In various embodiments, a point light source emits white light. When an intensity of light emitted by the point light source increases, an amount of color imparted by a processor to a moving virtual object increases and when the intensity decreases, the amount of color decreases. In some embodiments, a point light source emits colored light.

In several embodiments, the point light sources are scattered throughout the frustum 129 in a random manner. In various embodiments, the point light sources are placed in a structured manner, e.g., at position intervals, etc., within the frustum 129. In several embodiments, each point light source within the frustum 129 is stationary, e.g., non-mobile, etc. For example, a point light source within the frustum 129 does not move like a moving virtual object of the game 120. As another example, a light source within the frustum 129 does not move with movement of frames of the game 102.

A processor determines whether a virtual object is within the frustum 129 and whether the virtual object is within a range of illumination of a point light source within the frustum 129 for a moving picture frame. In response to determining that a virtual object is within the frustum 129 and is within the range of illumination of a point light source within the frustum 129 for a moving picture frame, a processor generates irradiance attributes associated with the virtual object for the moving picture frame. For example, when the virtual user 102 is at the position A and has the orientation M within the frustum 129, the virtual user 102 is within a range of illumination of the point light source 2. In some embodiments, when a virtual object is at a position and an orientation within the frustum 129, the virtual object is within a range of illumination of multiple point light sources.

On the other hand, in response to determining that a virtual object is within the frustum 129 and is outside ranges of illumination of all point light sources within the frustum 129 associated with a moving picture frame, the processor does not generate irradiance attributes associated with the virtual object for the moving picture frame. For example, when the virtual user 102 moves from the position A to a position C and has an orientation O within the frustum 129, the virtual user 102 is outside ranges of illumination of all the point light sources 1, 2, and 3.

In some embodiments, instead of a point light source, any other shape of light source, e.g., a square light source, a rectangular light source, a triangular light source, a polygonal light source, etc., is generated and placed by a processor within the frustum 129.

FIG. 4 is a diagram of an embodiment of a system 231 to illustrate obtaining irradiance attributes associated with a virtual object. Irradiance attribute values are illustrated by "x"s in Figures of the present disclosure. In various embodiments, a processor transfers a virtual object into another space, e.g., a light probe space, a world space, etc., from a game space, e.g., a scene of a game, etc., to generate irradiance attribute values associated with the virtual object. In some embodiments, a scaling, e.g., an upward scaling, a downward scaling, etc., is applied to a position and orientation of a virtual object in a game space to transfer the virtual object into a world space or a light probe space.

Figure 5A:
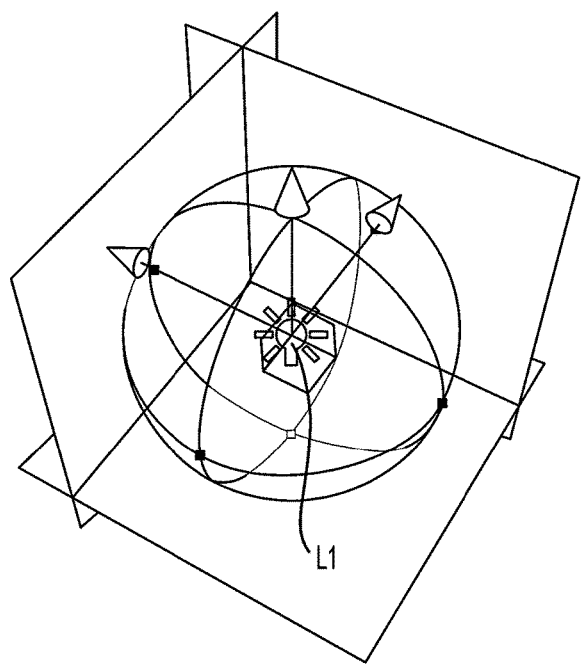
FIG. 5A is a diagram of a point light source, in accordance with one embodiment described in the present disclosure.
Figure 5B:
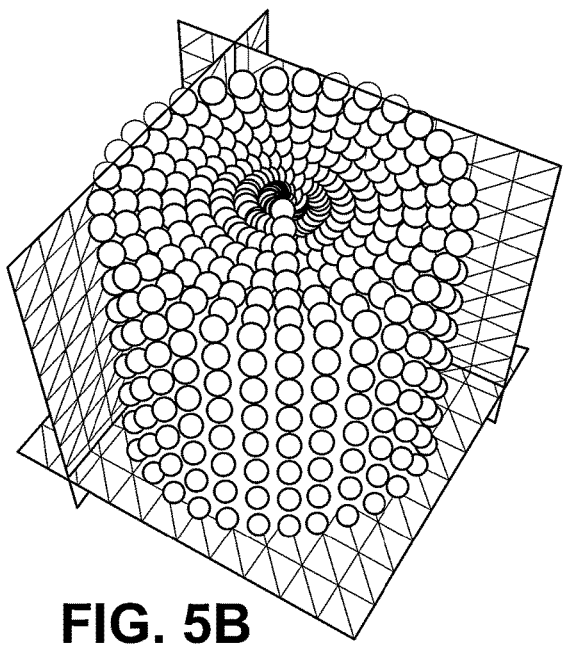
FIG. 5B is a diagram of a cylindrical structure that surrounds the point light source of FIG. 5A, in accordance with one embodiment described in the present disclosure.

A processor generates a cylindrical structure 233 within a light probe space 235 to surround the point light source 1 with the cylindrical structure 233. An example of a point light source L1 is illustrated in FIG. 5A and an example of a cylindrical structure that surrounds the point light source L1 is illustrated in FIG. 5B. The cylindrical structure of FIG. 5B includes multiple light probes that fill in a three-dimensional volume surrounding the point light source L1 of FIG. 5A.

Similarly, a processor generates cylindrical structures for the light point light sources 2 and 3 to surround the point light source 2 with a cylindrical structure and the point light source 3 with another cylindrical structure. All point light sources are surrounded by corresponding cylindrical structures.

In some embodiments, a processor generates the cylindrical structure 233 and the point light source 1 within a game space and hides the point light source 1 and the cylindrical structure 233 behind other virtual objects, e.g., a background of a game scene, a virtual lamp, a virtual light, etc.

The cylindrical structure 233 includes multiple light probes, e.g., a light probe P1, a light probe P2, a light probe P3, etc., and is a three-dimensional volume. The light probes are spaced on a surface and/or inside a volume of the cylindrical structure 233 at regular intervals. In some embodiments, the light probes are randomly placed on the surface and/or inside the volume of the cylindrical structure 233.

A light probe of a cylindrical structure samples light that is generated by a point light source surrounded by the cylindrical structure. For example, the light probes of the cylindrical structure 233 sample intensity of light that is generated by the point light source 1. In some embodiments, each light probe is a sampler circuit or a sampler computer program. In various embodiments, a sampler circuit or sampler computer program is integrated in a processor.

When the virtual user 102 is at a position 1 and an orientation 1, at least a portion of the virtual user 102 coincides with the cylindrical structure 233. When at least a portion of the virtual user 102 coincides with the cylindrical structure 233, light falls on the portion of the virtual user 102. The position A (FIG. 2) is an example of the position 1 and the orientation M (FIG. 2) is an example of the orientation 1.

In several embodiments, a vertex of the virtual user 102 coincides with a light probe. For example, a first vertex of the virtual user 102 coincides with a first light probe of the cylindrical structure 233 and a second vertex of the virtual user 102 coincides with a second light probe of the cylindrical structure 233. In various embodiments, a vertex is a point that describes a corner of a geometric shape or that describes an intersection between two geometric shapes. For example, a vertex of an angle is a point at which where two line segments intersect each other.

In various embodiments, a pixel is an addressable element, e.g., the smallest addressable element, etc., in an addressable display device. In some embodiments, a pixel is represented as dots or squares or timing mechanism and sweep rates. In several embodiments, each pixel is a sample of an image and an intensity of each pixel is variable.

In some embodiments, a pixel of the virtual user 102 coincides with a light probe. For example, a first pixel of the virtual user 102 coincides with a first light probe of the cylindrical structure 233 and a second pixel of the virtual user 102 coincides with a second light probe of the cylindrical structure 233.

In some embodiments, the cylindrical structure 233 surrounds all portions of the virtual user 102. In various embodiments, the cylindrical structure 233 does not surround any portion of the virtual user 102.

In some embodiments, the cylindrical structure 233 is sized to surround all virtual objects, e.g., moving virtual objects, etc., in the game 102 (FIG. 1). In several embodiments, the cylindrical structure 233 is sized to surround the largest of all virtual objects, e.g., moving virtual objects, etc., in the game 102.

Based on the sampled values of intensity from the light probes of the cylindrical structure 233, a processor performs an illumination operation for the position 1 and the orientation 1 of the virtual user 102. The illumination operation is performed to generate irradiance attributes 1, which include a set of intensities 1, a set of colors 1, and a set of other irradiance attributes 1, associated with the position 1 and the orientation 1 of the virtual user 102.

An intensity value, e.g., intensity attribute coefficient, V1, V2, etc., within the intensity set 1 is associated with a light probe. For example, a first intensity value within the intensity set 1 is received from the light probe P1, a second intensity value the intensity set 1 is received from the light probe P2, and a third intensity value within the intensity set 1 is received from a light probe P3. As another example, the intensity value V1 is associated with a light probe P4 of the cylindrical structure 233 and the intensity value V2 is associated with a light probe P5 of the cylindrical structure 233. Similarly, a color value, e.g., a color attribute coefficient, etc., within the color set 1 is associated with a light probe and another irradiance attribute value, e.g., another irradiance attribute coefficient, etc., within the other irradiance attributes set 1 is associated with a light probe.

Examples of other irradiance attributes of the other irradiance attributes set 1 include a distance between a vertex or a pixel of the virtual user 102 and the point light source 1, or a direction in which light irradiated by the point light source 1 is incident on the vertex or pixel, or a combination thereof. An example of the direction in which light irradiated by the point light source 1 is incident on the vertex or pixel is an angle formed by a light beam of the light and a normal to the vertex and pixel.

In some embodiments, an attribute coefficient that is output from the illumination operation is a spherical harmonic lighting coefficient. In various embodiments, an attribute coefficient that is output from the illumination operation is a coefficient other than a spherical harmonic lighting coefficient.

In various embodiments, an attribute coefficient is generated by applying the illumination operation at a time the virtual game 120 is offline, e.g., a server that provides game data of the game 120 is not communicating with a client device on which the game 120 is being played. Examples of the client device and the server are provided. In some embodiments, a client device and a computing device are used interchangeably herein.

In the embodiments in which a light probe coincides with a pixel of the virtual user 102, an attribute value of an attribute value set that is generated by performing the illumination operation is associated with the pixel. For example, a first attribute value of an attribute value set represents an intensity of light at a first pixel of the virtual user 102 and a second attribute value of the attribute value set represents an intensity of light at a second pixel of the virtual user 102.

In the embodiments in which a light probe coincides with a vertex of the virtual user 102, an attribute value of an attribute value set that is generated by performing the illumination operation is associated with the vertex. For example, a first attribute value of an attribute value set represents an intensity of light at a first vertex of the virtual user 102 and a second attribute value of the attribute value set represents an intensity of light at a second vertex of the virtual user 102.

In the embodiments in which the virtual user 102 does not coincide with the probes of the cylindrical structure 233 and is outside the cylindrical structure 233, e.g., when the virtual user 102 is at a position 2 and has an orientation 2, etc., a processor extrapolates an attribute value that is generated by performing the illumination operation to obtain an attribute value at a pixel or a vertex of the virtual user 102. For example, based on a distance between the point light source 1 and a light probe that is in a direction of a pixel or a vertex of the virtual user 102 and a distance between the light probe and the pixel or vertex, an attribute value at a position of the light probe is extrapolated to generate an attribute value at the pixel or vertex. In this example, a straight line passes through the point light source 1, the light probe, and the pixel or vertex for the vertex or pixel to be in the direction of the light probe from the point light source 1.

It should be noted that the operations described with reference to FIG. 4 as applicable to a light probe space are equally applicable to a game space or a world space. For example, a virtual object is not transferred from a game space to a light probe space or a world space to perform the operations described with reference to FIG. 4.

In some embodiments, a distance between consecutive co-ordinates in a light probe space is different, e.g., greater, smaller, etc., compared to that in a game space and a distance between consecutive co-ordinates in a world space is different, e.g., greater, smaller, etc., than that in the light probe space.

It should further be noted that although the cylindrical structure 233 is used to surround the point light source 1, in some embodiments, any other shaped structure, e.g., a volumetric spherical structure, a volumetric convex hull, a volumetric convex-shaped structure, a volumetric three-dimensional convex-shaped structure, a volumetric three-dimensional polygon, etc., is used to surround a point light source.

In some embodiments, the illumination operation is performed to generate one or more of the intensity set 1, or the color set 1, or the other irradiance attributes set 1. For example, in the embodiments in which all point light sources used within the frustum 129 (FIG. 3) emit white light, the color set 1 of color values is not generated.

FIGS. 5A and 5B are diagrams of embodiments of the illumination operation. When a pixel or vertex of the virtual user 102 is outside a structure, e.g., a three-dimensional spherical structure, a three-dimensional cylindrical structure, a three-dimensional polygonal structure, etc., a processor segments the structure into triangles or tetrahedrons and extrapolates an attribute value from a triangle or tetrahedron to the pixel or vertex on the virtual user 102 to generate an attribute value at the vertex or pixel. Moreover, when a pixel or vertex of the virtual user 102 is within a structure, a processor segments the structure into triangles or tetrahedrons and interpolates an attribute value from a triangle or tetrahedron to the pixel or vertex on the virtual user 102 to generate an attribute value at the vertex or pixel. Also, when a pixel or vertex of the virtual user 102 is at a position of a structure, a processor does not segment the structure into triangles or tetrahedrons and does not interpolate or extrapolate an attribute value from a triangle or tetrahedron to the pixel or vertex on the virtual user 102 to generate an attribute value at the vertex or pixel. For example, a sampler samples an attribute value at a position on the structure and the attribute value is the same as that on a pixel or vertex of the virtual user 102 that coincides with the position.

Figure 6:
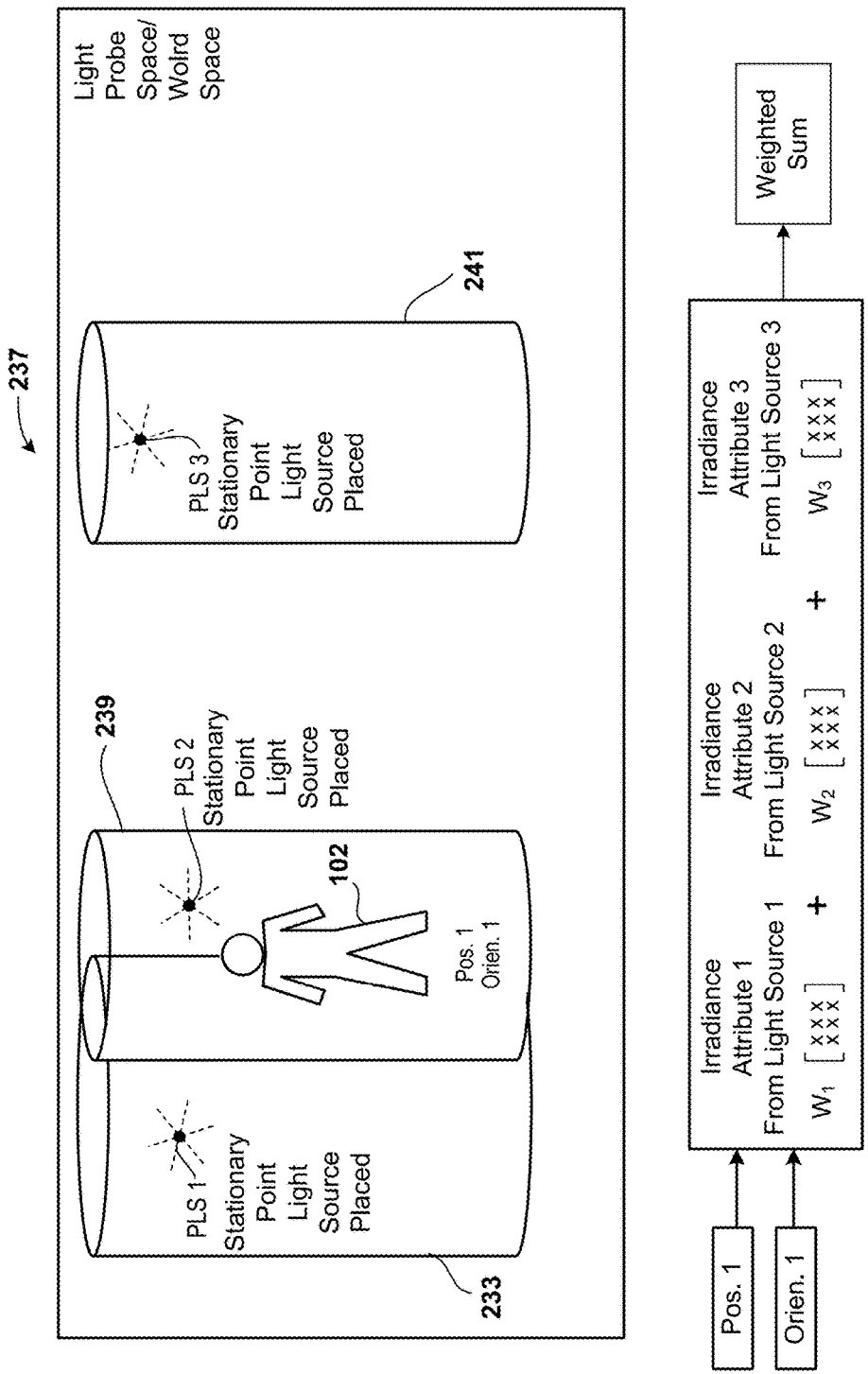
FIG. 6 is a diagram of a system for illustrating a weighted combination of irradiance attributes from multiple light sources, in accordance with one embodiment described in the present disclosure.

FIG. 6 is a diagram of an embodiment of a system 237 for illustrating a weighted combination of irradiance attributes from multiple light sources. The set of irradiance attributes are generated from the light source 1 as explained above with reference to FIG. 4, another set of irradiance attributes are generated based on intensities of light received by multiple light probes of a cylindrical structure 239 from the light source 2 in a manner similar to that described above with reference to FIG. 4, and yet another set of irradiance attributes are generated from intensities of light received by multiple light probes of a cylindrical structure 241 from the light source 3 in a manner similar to that described above with reference to FIG. 4. The cylindrical structure 239 surrounds the light source 2 and the cylindrical structure 241 surrounds the light source 3.

The virtual user 102 is at the position 1 and has the orientation 1 when the sets of attributes are generated from intensities of light received from the light sources 1, 2, and 3 by the cylindrical structures 233, 239, and 241.

In various embodiments, a cylindrical structure that surrounds a corresponding light source is stationary, e.g., stays in one position and one orientation, etc., regardless of movement of the virtual user 102. For example, a position and orientation of the cylindrical structure 233 stays the same independent of whether the virtual user 102 moves from a position within the cylindrical structure 233 to a position outside the cylindrical structure 233.

In several embodiments, a position and/or orientation of a cylindrical structure that surrounds a corresponding light source changes when a position and/or orientation of the virtual user 102 changes. For example, a position of the cylindrical structure 233 changes to surround the virtual user 102 when the virtual user 102 moves from a position within the cylindrical structure 233 to a position outside the cylindrical structure 233. As another example, an orientation of the cylindrical structure 233 changes to surround the virtual user 102 when an orientation of the virtual user 102 changes.

In some embodiments, a different shaped structure is used for a light source within a space than that used for another light source within the space. For example, a cylindrical structure is used to surround the light source 1 and a three-dimensional polygonal structure is used to surround the light source 2.

A processor applies a weight W1 to the set of irradiance attributes generated from intensities of light from the light source 1, applies a weight W2 to the set of irradiance attributes generated from intensities of light from the light source 2, and applies a weight W3 to the set of irradiance attributes generated from intensities of light from the light source 3 to generate a weighted sum. For example, a processor multiplies each irradiance attribute value corresponding to each light probe of the cylindrical structure 233 with the weight W1, multiplies each irradiance attribute value corresponding to each light probe of the cylindrical structure 239 with the weight W2, and multiplies each irradiance attribute value corresponding to each light probe of the cylindrical structure 241 with the weight W3 to generate the weighted sum.

In several embodiments, instead of generated a weighted sum from the irradiance attribute values corresponding to the light sources 1, 2, and 3, a processor generates a statistical value, e.g., a mean, a median, a standard deviation, a variance, etc., from the sets of irradiance attribute values generated from the light probes of the cylindrical structures 233, 239, and 241. For example, a processor generates a mean of an irradiance attribute value generated based on an intensity of light sampled from a light probe at a location on the cylindrical structure 233, an irradiance attribute value generated based on an intensity of light sampled from a light probe at a corresponding location on the cylindrical structure 239, and an irradiance attribute value generated based on an intensity of light sampled from a light probe at a corresponding location on the cylindrical structure 241. In some embodiments, a location of a light probe on a first cylindrical structure corresponds to a location of a light probe on a second cylindrical structure when the light probe on the first cylindrical structure has the same co-ordinates with respect to a centroid of the first cylindrical structure as co-ordinates of the light probe on the second cylindrical structure from a centroid of the second cylindrical structure.

Figure 7:
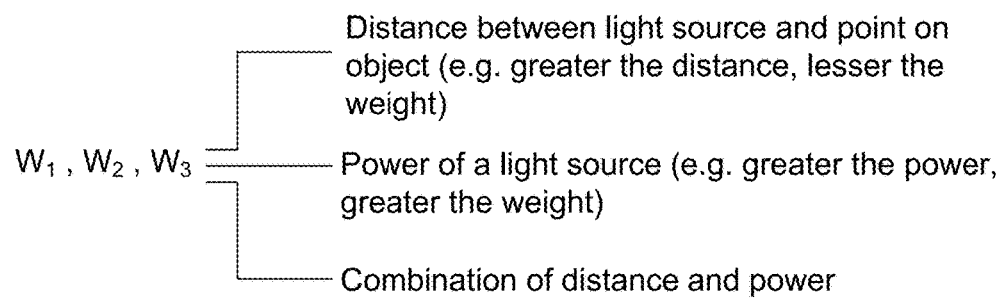
FIG. 7 is a diagram used to illustrate different factors used to generate a weight used to perform approximated diffuse lighting, in accordance with one embodiment described in the present disclosure.

FIG. 7 is a diagram used to illustrate different factors used to generate a weight e.g., the weight W1, the weight W2, the weight W3, etc., that is assigned to an attribute set described above with respect to FIG. 6. In some embodiments, a processor generates a weight that is assigned to irradiance attribute values associated with a point light source based on a distance between the point light source and the virtual user 102 (FIG. 6). For example, when a distance between the virtual user 102 and the light source 1 is greater than a distance between the virtual user 102 and the light source 2, a lesser amount of weight is assigned to irradiance attribute values generated from intensities of light produced by the light source 1 than that assigned to irradiance attribute values generated from intensities of light produced by the light source 2.

In various embodiments, a processor assigns a weight to irradiance attribute values of an attribute set generated from light that is produced by a light source based on an amount of power of the light source. For example, when the light source 1 has a greater amount of power, e.g., wattage, etc., compared to the light source 2, a processor determines that a value of the weight W1 is greater than a value of the weight W2.

In several embodiments, a processor uses a combination of distance of a light source from the virtual user 102 and power of the light source to determine a weight to assign to the light source. For example, when a distance between the virtual user 102 and the light source 1 is greater than a distance between the virtual user 102 and the light source 2 and when a power of the light source 1 is greater than a power of the light source 2, a processor determines that the weight W1 is greater than the weight W2. As another example, when a distance between the virtual user 102 and the light source 1 is less than a distance between the virtual user 102 and the light source 2 and when a power of the light source 1 is less than a power of the light source 2, a processor determines that the weight W1 is less than the weight W2. As yet another example, when a distance between the virtual user 102 and the light source 1 is less than a distance between the virtual user 102 and the light source 2 and when a power of the light source 1 is greater than a power of the light source 2, a processor determines that the weight W2 is less than the weight W1 or that the weight W1 is less than the weight W2. As another example, when a distance between the virtual user 102 and the light source 1 is greater than a distance between the virtual user 102 and the light source 2 and when a power of the light source 1 is less than a power of the light source 2, a processor determines that the weight W2 is less than the weight W1 or that the weight W1 is less than the weight W2.

Figure 8:
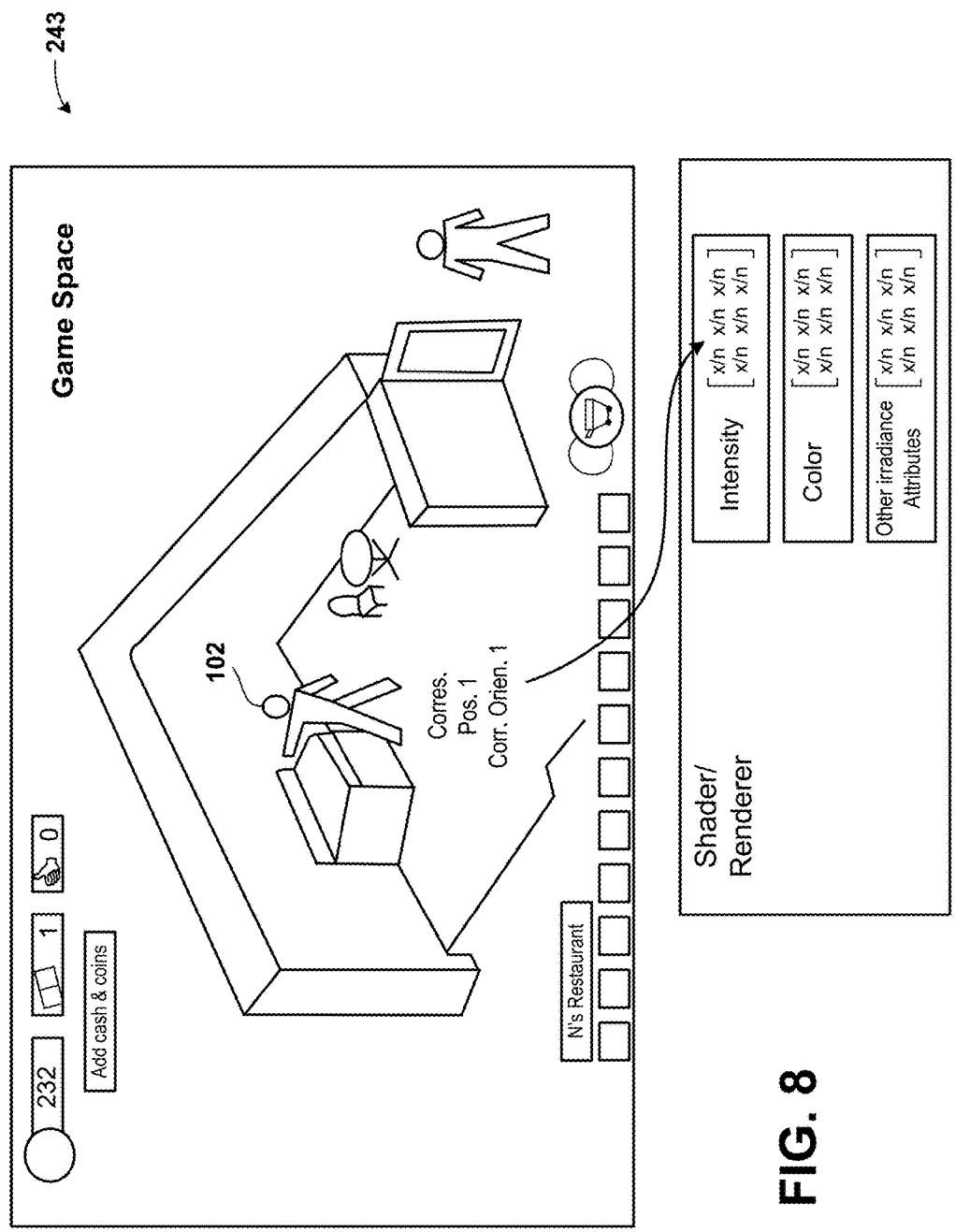
FIG. 8 is a diagram of a system to illustrate normalization of an irradiance attribute value generated from light produced by a light source, in accordance with one embodiment described in the present disclosure.

FIG. 8 is a diagram of an embodiment of a system 243 to illustrate normalization of an irradiance attribute value generated from light produced by a light source. The normalization is performed by a processor to transform an irradiance attribute value from a light probe space or world space to a game space, which includes virtual objects of the game 120.

The virtual user 102 is within a game space, e.g., a gaming environment, etc., that is used to play the game 120 (FIG. 1). In the game space, there are other objects of the game 120. For example, there is a virtual table, a virtual chair, a virtual cooking grill, a virtual restaurant, and a virtual customer of the restaurant. As shown, a real user has collected a number of virtual coins and virtual cash currency. In various embodiments, the game 120 allows a real user to achieve various game levels, game points, and/or real money, etc. For example, the more customers the virtual user 102 serves, the real user achieves a higher game level, a greater number of game points, and/or a higher amount of real money. As another example, the greater the number of social network friends a real user invites to play the game 120, the real user achieves a higher game level, a greater number of game points, and/or a higher amount of real money. As yet another example, the higher the number of goals achieved by a real user during play of the game 120, the real user achieves a higher game level, a greater number of game points, and/or a higher amount of real money.

A processor normalizes each irradiance attribute value generated from light produced by a light source to transform the irradiance attribute value from a world space or a light probe space to a game space. A normalization value is illustrated by "n" in FIG. 8. As an example, a processor calculates a normalization value as a ratio of a distance between the virtual user 102 and the light source 1 in a world space or a light probe space and a distance between the virtual user 102 and the light source 1 in a game space and divides all irradiance attribute values generated from light emitted by the light source 1 by the normalization value.

In some embodiments, a light probe space or a world space is not used to play the game 120. The light probe space or the world space is used to place a point light source within the light probe space or the world space to generate attribute values from light emitted by the point light source.

In various embodiments, irradiance attribute values, normalized or not, are stored in a shader, which is sometimes referred to herein as a renderer. A shader is a computer program embodied within a non-transitory computer-readable medium and executed by a graphical processing unit (GPU) to render a virtual object within the game 120.

In some embodiments, irradiance attribute values, normalized or not, are stored in a memory device that is connected to a processor, e.g., a CPU, etc. The CPU is connected to the GPU via a bus.

Examples of a memory device include a volatile or a non-volatile memory device. To illustrate, a memory device includes a Flash memory, a redundant array of disks, a random access memory (RAM), a read-only memory (ROM), etc. A memory device is an illustration of a non-transitory computer-readable medium.

In some embodiments in which there is no transformation performed by a processor from a game space to another space, e.g., a light probe space, world space, etc., to generate irradiance attribute values, there is no need to normalize an attribute value to transform the attribute value from the other space to the game space.

It should be noted that although the system 237 is described using three light sources, in some embodiments, the system 237 includes any number of light sources that shine light on the virtual user 102.

Figure 9:
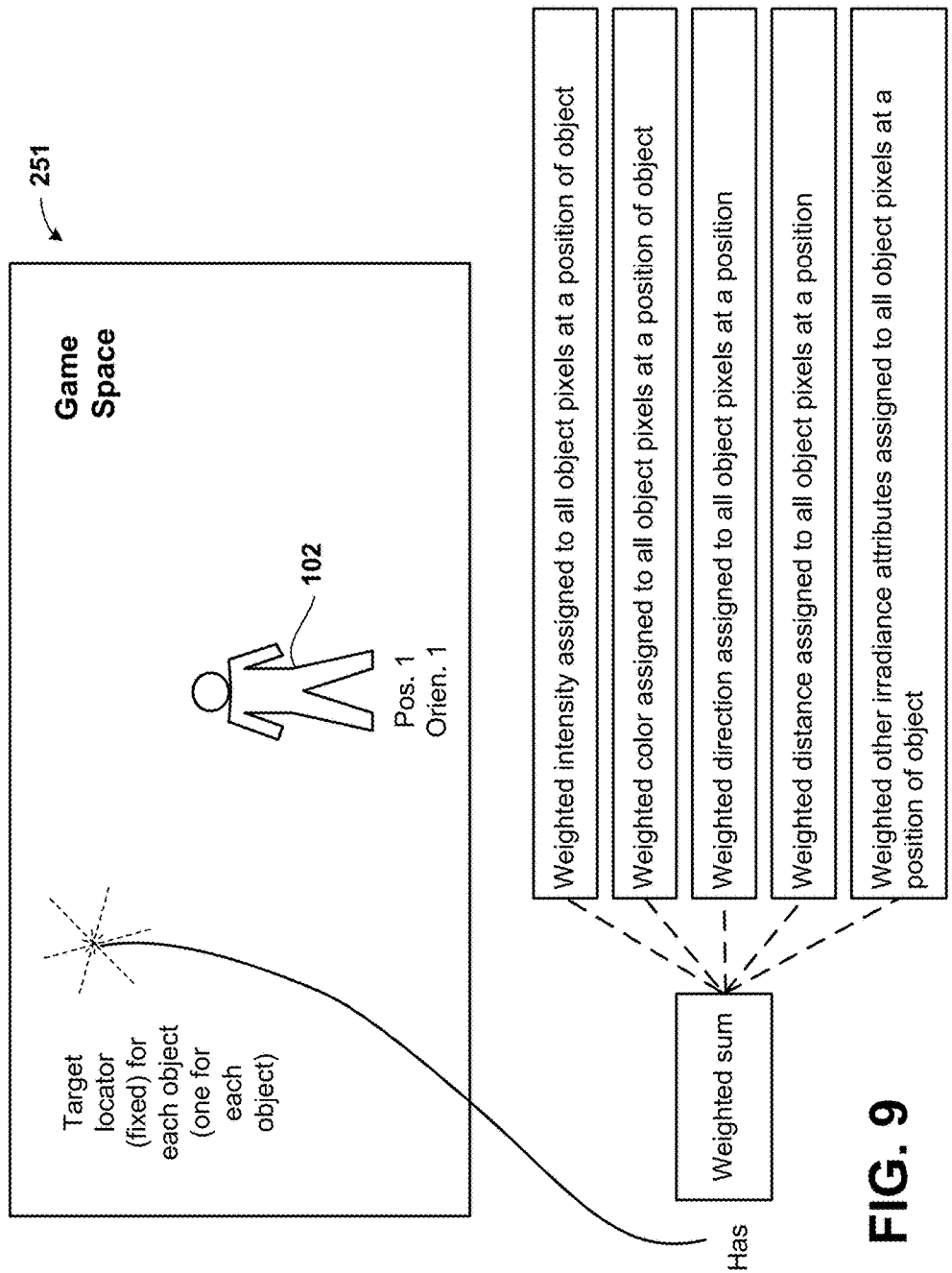
FIG. 9 is a diagram of a system used to illustrate generation of a target locator from a weighted sum generated from light that is incident on a virtual user of the game of FIG. 1, in accordance with one embodiment described in the present disclosure.

FIG. 9 is a diagram of an embodiment of a system 251 used to illustrate generation of a target locator, which is a weighted light source, from a weighted sum generated from light that is incident on the virtual user 102 and that is generated by multiple point light sources.

In some embodiments, a target locator and a combined light source are used interchangeably herein.

A GPU generates, e.g., renders, etc., the target locator within a game space from a weighted sum. For example, the GPU generates the target locator having the weighted sum as characteristic properties. Moreover, a processor associates, e.g., tags, etc., the target locator with the virtual user 102 on whom light is incident from the multiple light sources 1, 2, and 3 (FIG. 6) to generate the weighted sum.

The weighted sum that is associated with the virtual user 102 and with the target locator includes, for example, weighted intensities assigned to pixels or vertices of the virtual user 102 having a position and an orientation of the virtual user 102, or weighted colors assigned to the pixels or the vertices of the virtual user 102 at the position and orientation, or weighted directions of light emitted by the target locator and that is incident on the pixels or the vertices of the virtual user 102 at the position and orientation, or a weighted position of the target locator from the pixels or the vertices of the virtual user 102 at the position and orientation, or weighted other irradiance attributes that are associated with the target locator and that are assigned to the pixels or the vertices of the virtual user 102 at the position and orientation, or a combination thereof. The weighted intensities assigned to pixels or vertices of the virtual user 102 include intensities of light that is emitted by the target locator. The weighted intensities include a weighted sum of intensities of light that is emitted by multiple point light sources and that is incident on the pixels or vertices of the virtual user 102. Similarly, the weighted colors of pixels or vertices of the virtual user 102 include colors of light that is emitted by the target locator. The weighted colors include a weighted sum of intensities of colors of light that is emitted by multiple point light sources and that is incident on the pixels or vertices of the virtual user 102. The weighted distance of the target locator from pixels or vertices of the virtual user 102 is a weighted sum of distances of light that is emitted by multiple point light sources and that is incident on the pixels or vertices of the virtual user 102. As another example, the target locator that is associated with the virtual user 102 emits light having an irradiance attribute value at a pixel or a vertex of the virtual user 102 as that of a weighted sum of irradiance attribute values of light emitted by multiple point light sources incident at the pixel or the vertex.

In various embodiments, the weighted intensities assigned to pixels or vertices of the virtual user 102 include radiuses of light emitted by the target locator at positions of the pixels or vertices.

In some embodiments in which multiple virtual objects are used in the game 120, a target locator is generated by a GPU for one moving virtual object of the game 120 and the target locator is associated with the moving virtual object at all positions and orientations of the moving virtual object. For example, a first target locator is generated from light that is emitted by one or more point light sources and that is incident on a first virtual object and a second target locator is generated from light that is emitted by one or more point light sources and that is incident on a second virtual object. Moreover, in this example, when the first virtual object moves from one position to another and/or changes orientation, a processor calculates irradiance attribute values of light emitted by the first target locator on the first virtual object without considering, e.g., calculating, etc., irradiance attribute values of light emitted by the second target locator and incident on the first virtual object. Furthermore, in this example, when the second virtual object moves from one position to another and/or changes orientation, a processor calculates irradiance attribute values of light emitted by the second target locator on the second virtual object without considering irradiance attribute values of light emitted by the first target locator and incident on the second virtual object.

In various embodiments, a GPU embodies the target locator within a virtual object of the game 120. For example, a GPU renders a virtual lamp within the game 120 and places the target locator within the lamp. As another example, a GPU renders a virtual chandelier within the game 120 and places the target locator within the chandelier.

Figure 10:
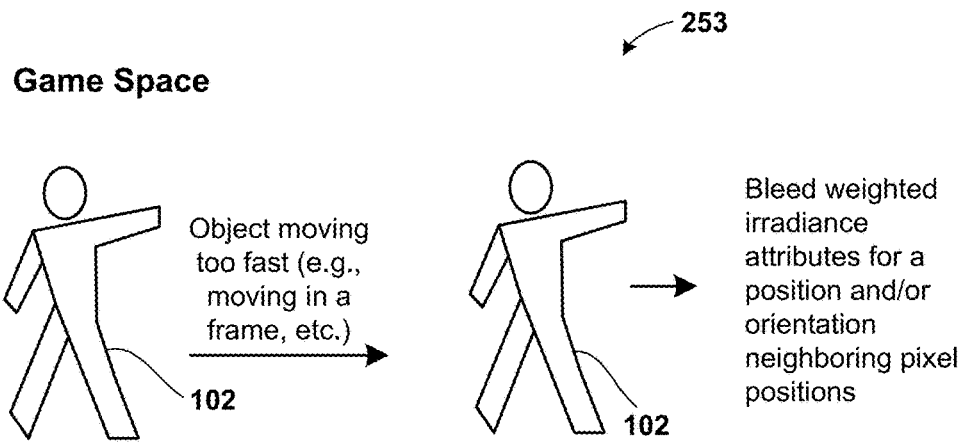
FIG. 10 is diagram of a system used to illustrate bleeding of weighted irradiance attributes when the virtual user moves quickly within a game space, in accordance with one embodiment described in the present disclosure.

FIG. 10 is diagram of an embodiment of a system 253 used to illustrate bleeding of weighted irradiance attributes when the virtual user 102 moves quickly within a game space. The weighted irradiance attributes are within a weighted sum that is associated with the target locator.

A processor bleeds, e.g., assigns, etc., a weighted irradiance attribute value of a pixel of the virtual user 102 to a neighboring pixel of the virtual user 102 when the virtual user 102 moves quickly within the game 102, e.g., moves within a frame, moves faster than a frame rate, etc. For example, a processor assigns a weighted intensity of a pixel to a neighboring pixel. In some embodiments, a first pixel of a virtual object is a neighbor of a second pixel of the virtual object when the first pixel is adjacent to the second pixel or when the first pixel is at a pre-determined range from the second pixel. In some embodiments, a pixel is adjacent to another pixel when there is no pixel located between the two pixels.

In various embodiments, instead of using the weighted irradiance attribute value of a pixel, a processor assigns weights to irradiance attribute values of multiple pixels that are neighbors to a pixel and calculates a statistical combination, e.g., mean, median, weighted sum, etc., of the irradiance attribute values to generate a statistical combined attribute. The statistical combined attribute is assigned to the pixel.

In several embodiments, in a manner similar to that described above, a processor bleeds, e.g., assigns, etc., a weighted irradiance attribute value of a vertex of the virtual user 102 to a neighboring vertex of the virtual user 102 when the virtual user 102 moves quickly within the game 102. For example, a processor assigns a weighted intensity of a vertex to a neighboring vertex. In various embodiments, a first vertex of a virtual object is a neighbor of a second vertex of the virtual object when the first vertex is adjacent to the second vertex or when the first vertex is at a pre-determined distance from the second vertex. In some embodiments, a vertex is adjacent to another vertex when there is no vertex located between the two vertices.

In various embodiments, instead of using the weighted irradiance attribute value of a vertex, a processor assigns weights to irradiance attribute values of vertices that are neighbors to a vertex and calculates a statistical combination of the irradiance attribute values to generate a statistical combined attribute. The statistical combined attribute is assigned to the vertex.

In various embodiments, any operations described herein as being performed by a processor are performed by a CPU, a GPU, or a combination thereof. Moreover, in some embodiments, any operations described herein as being performed by a GPU are performed by a CPU or a combination of the GPU and the CPU.

Figure 11A:
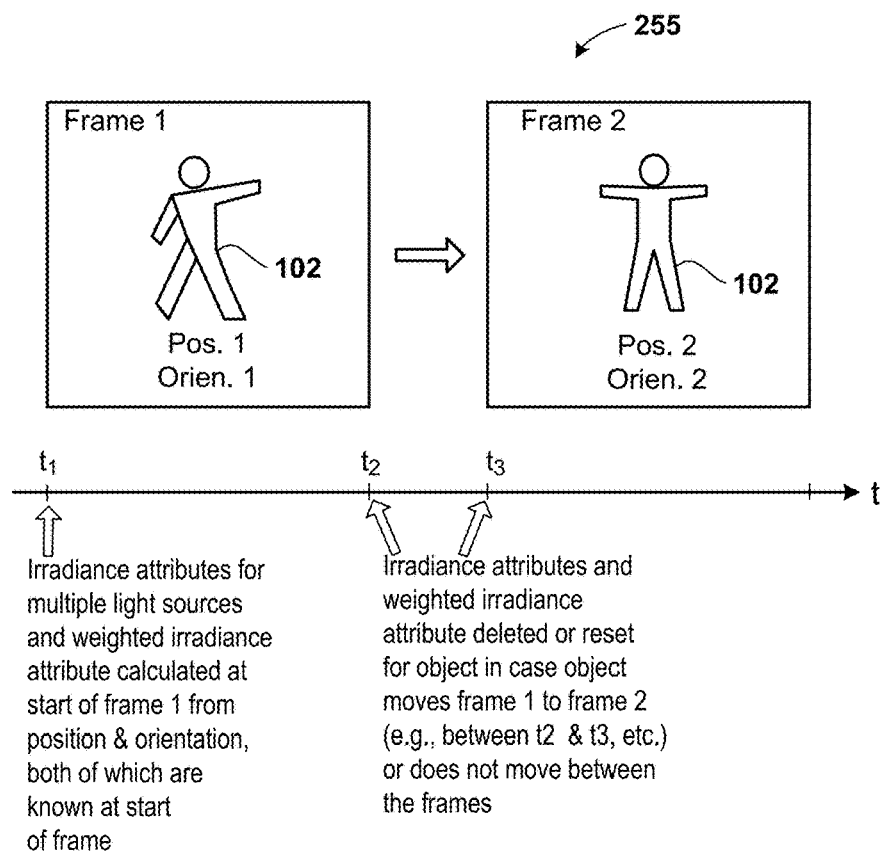
FIG. 11A is a diagram of a system that is used to illustrate deletion and regeneration of irradiance attribute values, in accordance with one embodiment described in the present disclosure.

FIG. 11A is a diagram of an embodiment of a system 255 that is used to illustrate deletion and regeneration of irradiance attribute values. At a time 1, a GPU renders a frame 1 and the virtual user 102 within the frame 1. Rendering of the frame 1 is initiated by a GPU at a time t1 and the GPU ends rendering of the frame 1 at a time t2. In some embodiments, a frame includes a game space. Within the frame 1, the virtual user 102 has the position 1 and the orientation 1. For rendering the frame 1, a processor calculates irradiance attribute values to be assigned to all pixels or vertices of the virtual user 102 at the position 1 and the orientation 1 based on light that is emitted from one or more point light sources and calculates a weighted sum of the irradiance attribute values. The weighted sum of attribute values is assigned to pixels or vertices of the virtual object 102 at the position 1 and the orientation 1 at the time t1. Similarly, for rendering the frame 2, e.g., between the times t2 and t3, between the times t1 and t3, etc., a processor calculates irradiance attribute values to be assigned to all pixels or vertices of the virtual user 102 at the position 2 and the orientation 2 based on light that is emitted from one or more point light sources and calculates a weighted sum of the irradiance attribute values. The weighted sum of attribute values is assigned to pixels or vertices of the virtual object 102 at the position 2 and the orientation 2 at the time t3.

A processor resets, e.g., deletes, erases, etc., the irradiance attribute values and the weighted sum for the frame 1 at the time t2 at which the frame 1 ends independent of whether the virtual user 102 moves between the frame 1 and a frame 2, which is rendered consecutive to the frame 1. For example, the virtual user 102 is stationary between the frames 1 and 2. In this example, a processor deletes the irradiance attribute values and the weighted sum assigned to pixels or vertices of the virtual user 102 in the frame 1 at the time t2. As another example, the virtual user 102 moves between the frames 1 and 2. In this example, a processor deletes the irradiance attribute values and the weighted sum assigned to pixels or vertices of the virtual user 102 in the frame 1 at the time t2.

In some embodiments, instead of resetting the irradiance attribute values and the weighted sum at the time t2, a processor resets the irradiance attribute values and the weighted sum of the frame 1 at a time t3, which is a time of initiation of rendering of the frame 2, which is rendered by a GPU.

In various embodiments, a processor does not reset the irradiance attribute values and the weighted sum that are assigned to pixels or vertices of the virtual user 102 at the time t2 or the time t3 upon determining that a position and an orientation of the virtual user 102 has not changed between the frames 1 and 2.

In some embodiments, when a processor bleeds weighted irradiance attribute values from one or more pixels to one or more neighboring pixels or from one or more vertices to one or more neighboring vertices, the processor resets the weighted irradiance attribute values at the time t2 or the time t3 independent of whether the virtual user 102 moves during transition from the frame 1 to the frame 2. For example, pixels of the virtual user 102 that have received bleeded weighted irradiance attribute values from one or more neighboring pixels of the virtual user 102 are reset when a frame that displays the virtual user 102 ends, regardless of whether the virtual user 102 moves between the frame and a preceding frame. As another example, vertices of the virtual user 102 that have received bleeded weighted irradiance attribute values from one or more neighboring vertices of the virtual user 102 are reset when a frame that displays the virtual user 102 ends, regardless of whether the virtual user 102 moves between the frame and a preceding frame.

Figure 11B:
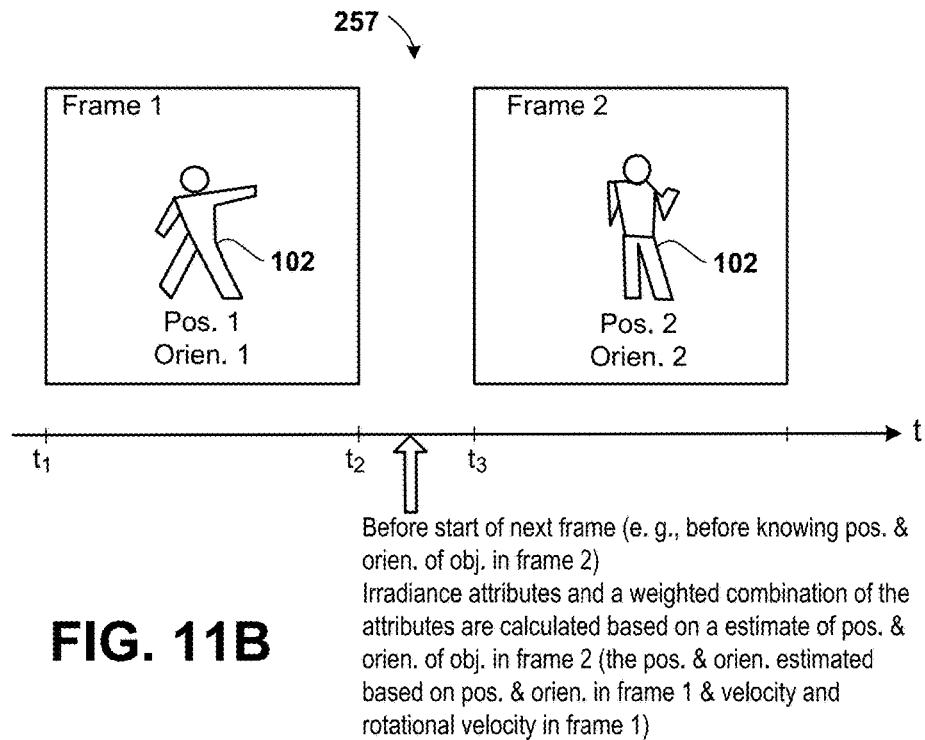
FIG. 11B is a diagram of a system for illustrating using an estimated position and an estimated orientation of the virtual user within a frame to generate irradiance attribute values of the virtual user within the frame, in accordance with one embodiment described in the present disclosure.

FIG. 11B is a diagram of an embodiment of a system 257 for illustrating using an estimated position and an estimated orientation of the virtual user 102 within the frame 2 to generate irradiance attribute values of the virtual user 102 within the frame 2. A processor calculates a linear velocity and a rotational velocity of the virtual user 102 based on movement of the virtual user 102 within the frame 1 or within the frame 1 and a number of frames that precede the frame 1 or within the frames that precede the frame 1 and time period in which the movement occurs. In some embodiments, movement includes a linear movement, or a rotational movement, or a combination thereof.

Before the frame 2 is rendered, e.g., between the times t2 and t3, a processor estimates a position of the virtual user 102 in the frame 2 based on the calculated linear velocity and a time period between the frame 1 and the frame 2 and/or estimates an orientation of the virtual user 102 in the frame 2 based on the calculated rotational velocity and the time period between the frames 1 and 2. The time period between the frames 1 and 2 is a frame rate of rendering the frames 1 and 2. Upon estimating the position or orientation of the virtual user 102 in the frame 2 and determining that the estimated position is different from the position in the frame 1 or that the estimated orientation is different from the orientation in the frame 1, a processor resets irradiance attribute values of the virtual user 102 at an end of the frame 1 and calculates irradiance attribute values of pixels or vertices of the virtual user 102 in the frame 2 based on the estimated position and orientation of the virtual user 102 in the frame 2. The irradiance attribute values are used to calculate the weighted combination of the irradiance attribute values. The virtual user 102 is estimated to have the position 2 and the orientation 2 in the frame 2.

Figure 11C:
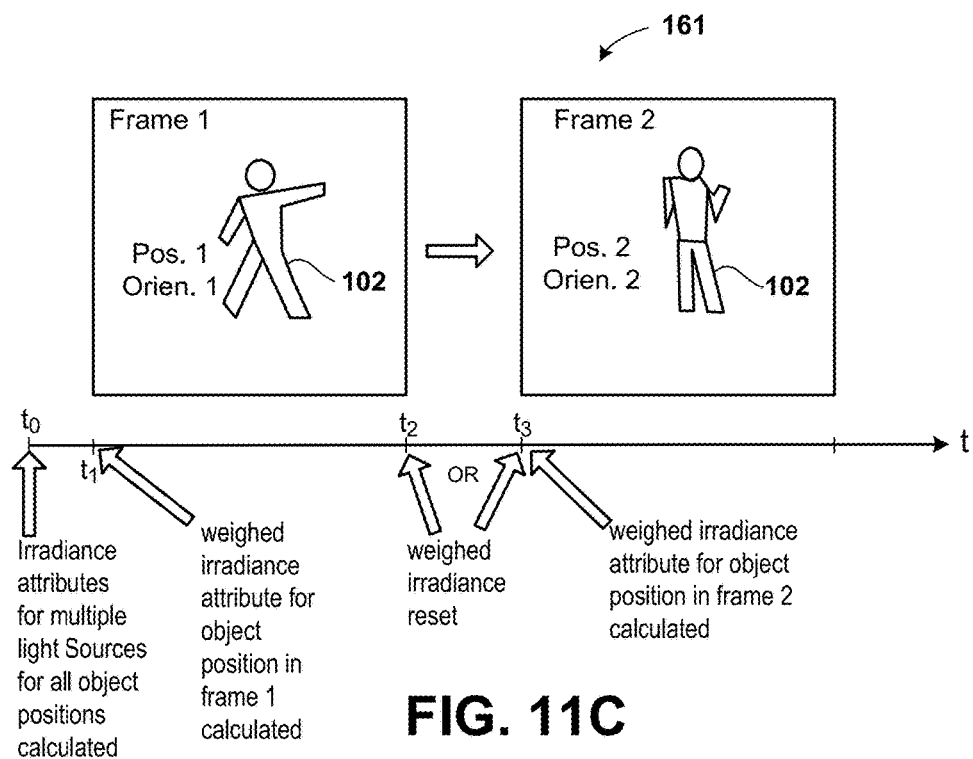
FIG. 11C is a diagram of a system for illustrating pre-calculation of irradiance attribute values for various positions and orientations of the virtual user, in accordance with one embodiment described in the present disclosure.

FIG. 11C is a diagram of an embodiment of a system 161 for illustrating pre-calculation of irradiance attribute values for various positions and orientations of the virtual user 102. At a time t0, which is before the frame 1 is rendered, irradiance attribute values are calculated by a processor based on light that is emitted from one or more point light sources for all positions and orientations of the virtual user 102 within the game 120 (FIG. 1). At the time t1, when a GPU begins to render the frame 1, a processor calculates a weighted sum of the irradiance attribute values when the virtual user 102 is at the position 1 and has the orientation 1. Moreover, at the time t2 at an end of rendering of the frame 1 or at the time t3 at a beginning of rendering of the frame 2 or between the times t2 and t3, the weighted sum is reset to zero by a processor. Moreover, at the time t3 at which rendering of the frame 2 is initiated or between times t2 and t3, a processor calculates a weighted sum from irradiance attribute values for the virtual user 102 at the position 2 and the orientation 2 in the frame 2. There is no need to calculate irradiance attribute values for the virtual user 102 at the position 2 and the orientation 2 in the frame 2 between the times t2 and t3.

In some embodiments, instead of changing the position and orientation of the virtual user 102 between the frames 1 and 2, the position or the orientation of the virtual user 102 changes between the frames 1 and 2.

Figure 12A:
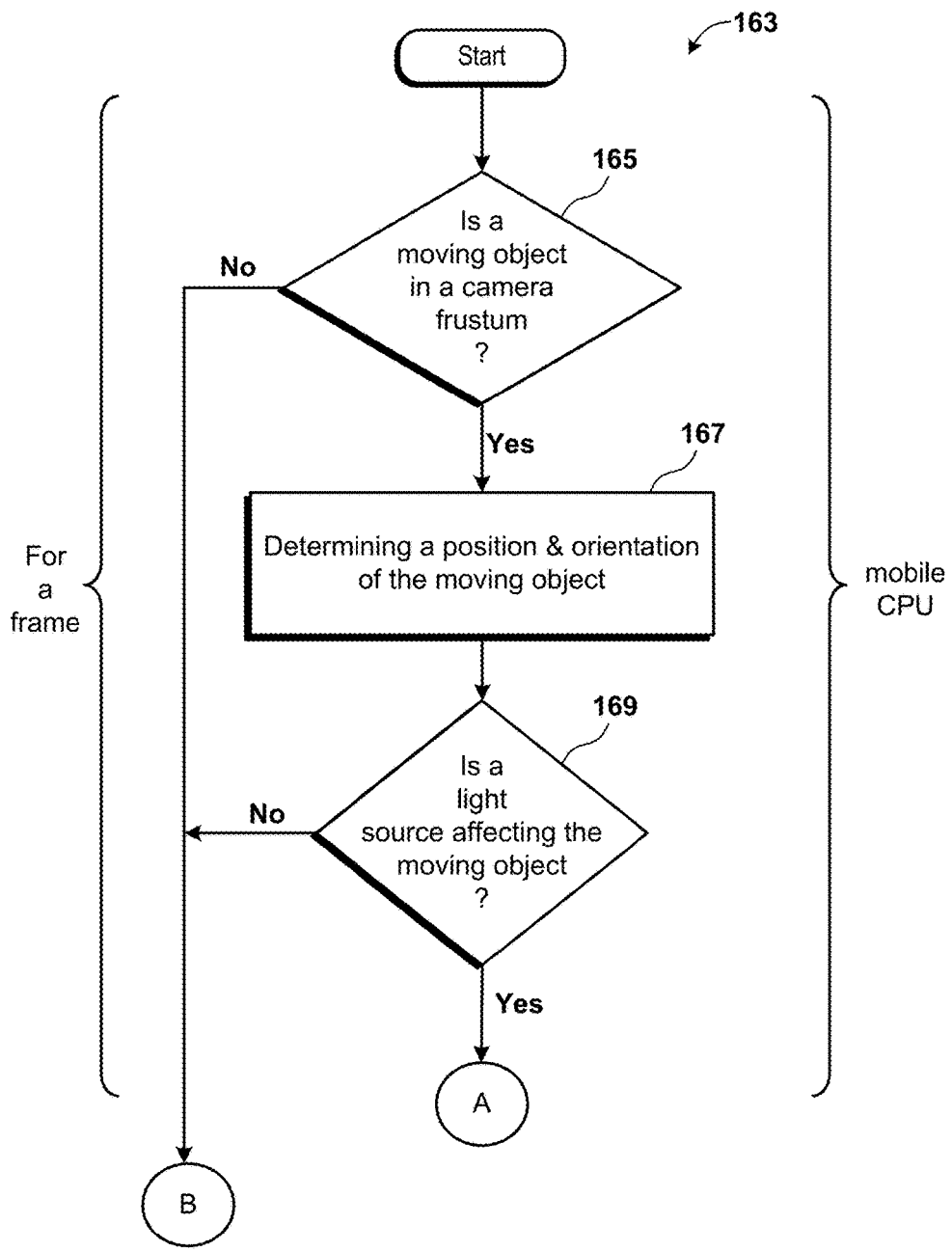
FIG. 12A is a flowchart of a method for approximated diffuse lighting of a virtual object, in accordance with one embodiment described in the present disclosure.
Figure 12B:
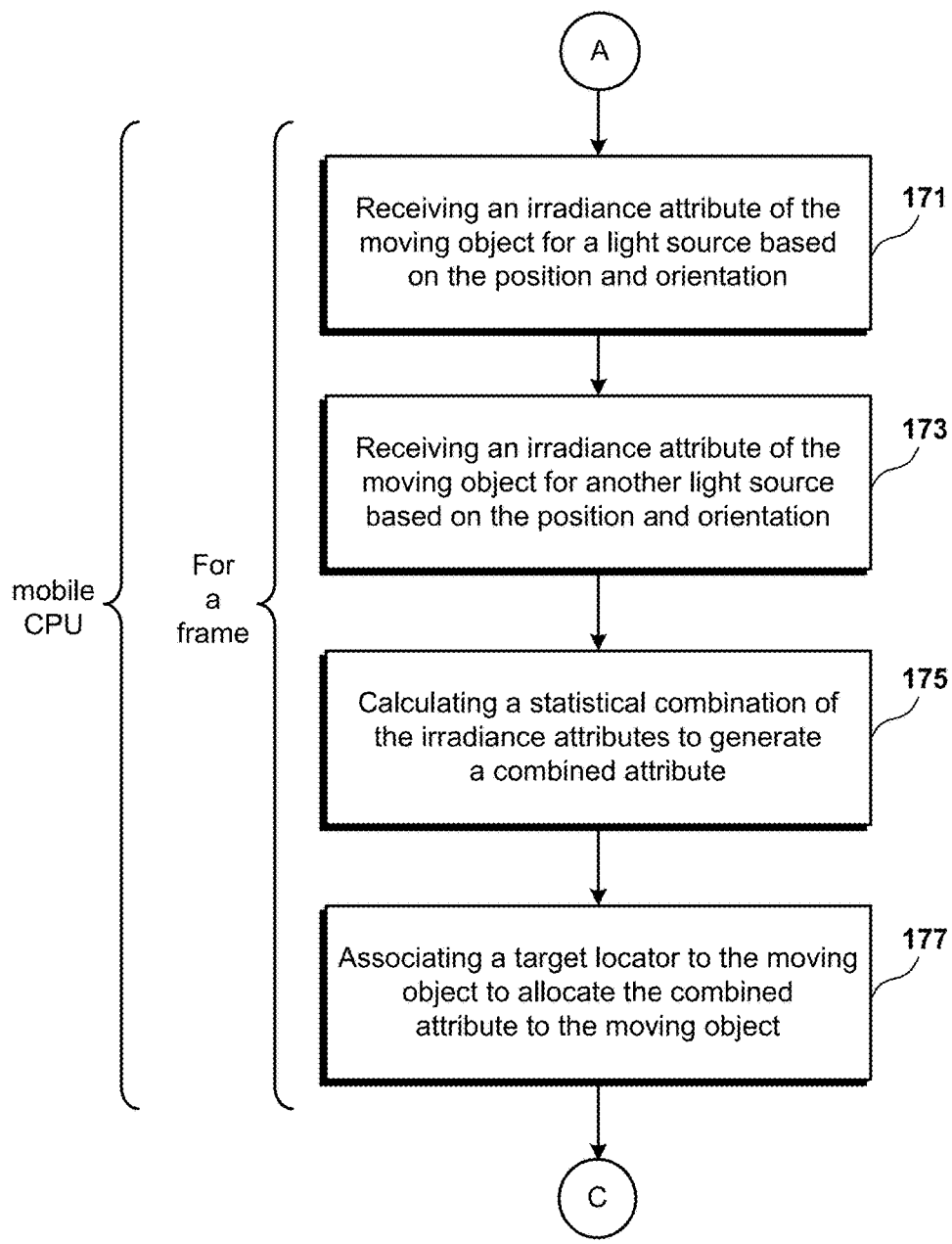
FIG. 12B is a continuation of the flowchart of FIG. 12A, in accordance with one embodiment described in the present disclosure.
Figure 12C:
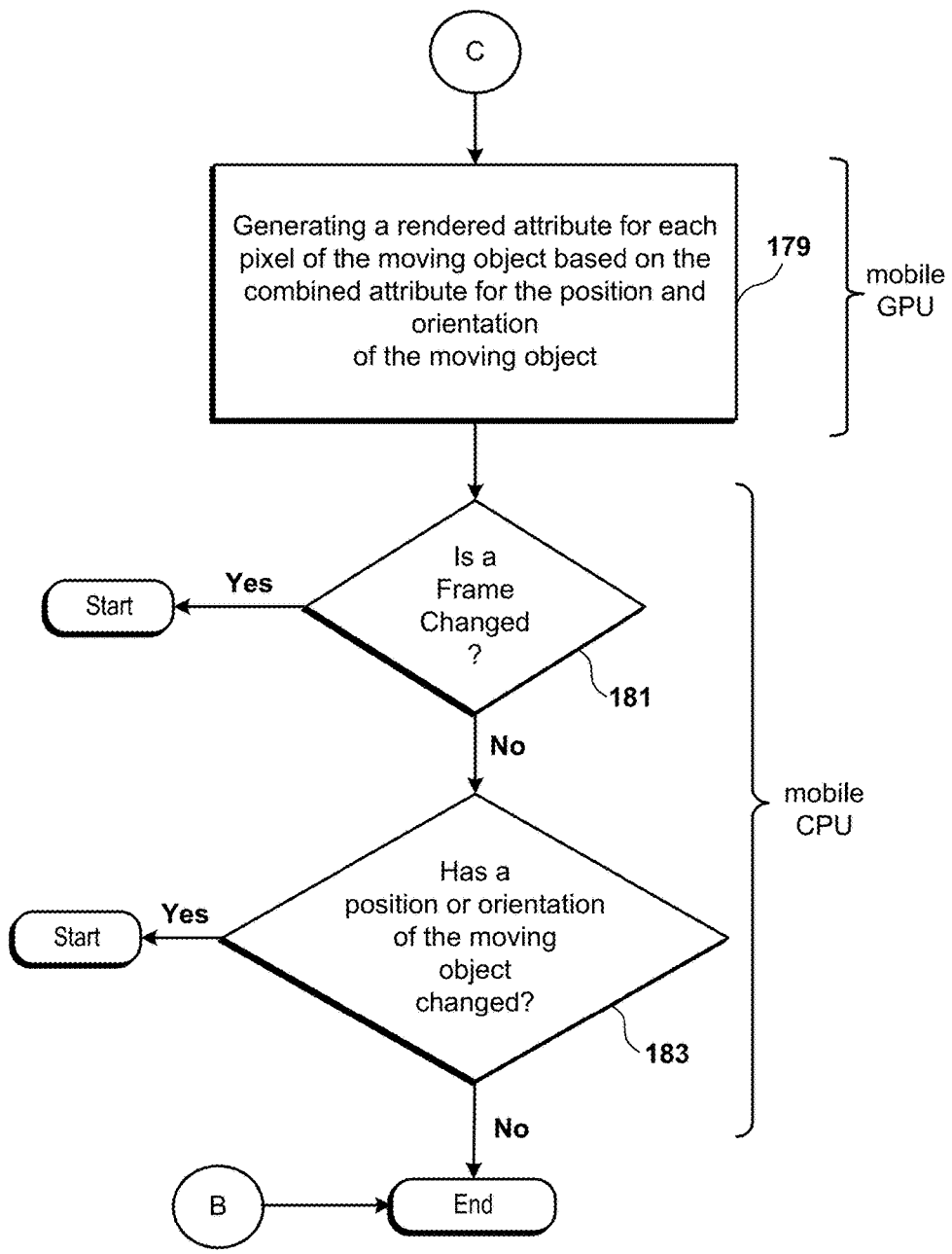
FIG. 12C is a continuation of the flowchart of FIG. 12B, in accordance with one embodiment described in the present disclosure.

FIG. 12A is a flowchart of an embodiment of a method 163 for approximated diffuse lighting of a virtual object, FIG. 12B is a continuation of the method 163 of FIG. 12A, and FIG. 12C is a continuation of the method 163 of FIG. 12B. The method 163 is executed by a processor, e.g., a CPU, etc., or a GPU, or a combination thereof.

In an operation 165 of the method 163, it is determined whether a virtual object that is capable of moving within a game is located within a frustum of a camera.

In response to determining that the virtual object is located outside the frustum of the camera, the method 163 ends.

On the other hand, in response to determining that the virtual object is located within the frustum of the camera, an operation 167 is performed. In the operation 167, a position and an orientation of the virtual object is determined within a co-ordinate system, e.g., a co-ordinate system of a game space, a co-ordinate system of a light probe space, a co-ordinate system of a world space, etc.

Moreover, in an operation 169, it is determined whether a point light source is affecting the virtual object. For example, it is determined whether light from any point light source within a space in which the virtual object is located reaches the moving object. As another example, it is determined whether a radius of light from any point light source within a space in which the virtual object is located encompasses at least a portion of the virtual object. Upon determining that the point light source is not affecting the virtual object, the method 163 ends.

On the other hand, upon determining that the point light source affects the virtual object, in an operation 171, an irradiance attribute, e.g., light intensity, light color, light direction, light distance, etc., of pixels or vertices of the virtual object is received from another processor. For example, a set of irradiance attribute values that are generated from light emitted from the point light source when the virtual object is at the position 1 and the orientation 1 is received from the other processor. The other processor does not execute the method 163 and does perform the illumination operation described with reference to FIG. 4.

In some embodiments, instead of receiving the irradiance attribute in the operation 171 from the other processor that does not perform the method 163, one or more processors that perform the method 163 generate the irradiance attribute from sampled data of light that is received by at least a portion of the virtual object from the point light source.

In some embodiments, instead of receiving the irradiance attribute in the operation 171, one or more processors that perform the method 163 identify the irradiance attribute from within a memory device. The irradiance attribute is associated, e.g., uniquely linked, etc., with a group of pixels or vertices of the virtual user 102 within the memory device.

In an operation 173, an irradiance attribute, e.g., a set of irradiance attribute values, etc., of pixels or vertices of the virtual object is received from the other processor. The irradiance attribute received in the operation 173 are calculated from light that is incident on the virtual object and that is generated by another point light source within the space in which the light source associated with the operation 171 is located. The irradiance attribute received in the operation 173 is generated when the virtual object is the position 1 and the orientation 1.

In some embodiments, instead of receiving the irradiance attribute in the operation 173 from the other processor that does not perform the method 163, the one or more processors that perform the method 163 generate the irradiance attribute that is received in the operation 173 from sampled data of light that is received by at least a portion of the virtual object from the other point light source of the operation 173.

In various embodiments, instead of receiving the irradiance attribute in the operation 173, one or more processors that perform the method 163 identify the irradiance attribute from within a memory device. The irradiance attribute is associated, e.g., uniquely linked, etc., with a group of pixels or vertices of the virtual user 102 within the memory device.

In an operation 175, a statistical combination, e.g., a weighted sum, mean, median, etc., of the irradiance attributes received in the operations 171 and 173 is calculated to generate a combined attribute, e.g., a weighted sum of the irradiance attributes, etc. Furthermore, in an operation 177, a target locator is associated with the virtual object to allocate the combined attribute to the virtual object. For example, the target locator is assigned properties of the combined attribute and is linked to the virtual object to emit light towards the virtual object. As another example, all point sources that are used to generate the target locator are replaced with the target locator and the target locator emits light having the combined attribute towards the virtual object.

With reference to FIG. 12C, in an operation 179, a GPU generates a rendered attribute for each pixel or vertex of the virtual object at the position 1 and having the orientation 1 based on the combined attribute. For example, upon rendering, pixels or vertices of the virtual object has intensities of light that is emitted by the target locator towards the virtual object. As another example, pixels or vertices of the virtual object has colors of light that is emitted by the target locators towards the virtual object.

In some embodiments, as an amount of a weighted intensity that is assigned to a pixel or a vertex of the virtual object increases, an amount of color rendered for display within the pixel or the vertex on a display device increases. Moreover, as the amount of the weighted intensity decreases, the amount of color rendered for display within the pixel or the vertex on the display device decreases.

In an operation 181, it is determined whether a frame of the game is to be changed. For example, it is determined whether there is a transition from rendering of the frame 1 to the frame 2. Upon determining that the frame is changed to a next, e.g., consecutively rendered, etc., frame, the operations 165, 167, 169, 171, 173, 175, 177, and 179 are repeated for the next frame. The repetition of the operations 165, 167, 169, 171, 173, 175, 177, and 179 for the next frame makes the method 163 dynamic. For example, it is determined whether in the next frame, the virtual object is still within the frustum of the camera. As another example, it is determined whether in the next frame, any light source within a space is still affecting the moving object. As yet another example, irradiance attributes from multiple point light sources are received in the operations 171 and 173 when the virtual object is in the next frame. As yet another example, a combined attribute for the virtual object in the next frame is generated in the operation 175 and a target locator is associated with the virtual object for the next frame. It should be noted that the target locator that is generated for the next frame is the same as that of the preceding frame except that an intensity of light incident on the virtual object may have changed in the next frame. As still another example, pixels and/or vertices of the virtual object are rendered to have the combined attribute when the virtual object is in the next frame.

Upon determining that the frame is not changed in the operation 181, in an operation 183 it is determined whether a position and/or orientation of the virtual object is changed. For example, it is determined whether the position 1 is changed to the position 2 and/or whether the orientation 1 is changed to the orientation 2. Upon determining that the position and/or the orientation of the virtual object is unchanged, the method 163 ends.

On the other hand, upon determining that the position and/or orientation of the virtual object is changed, the operations 165, 167, 169, 171, 173, 175, 177, and 179 are repeated for the changed position and/or the changed orientation. For example, it is determined whether in the changed position and/or the changed orientation, the virtual object is still within the frustum of the camera. As another example, it is determined whether in the changed position and/or the changed orientation, any light source of a space is still affecting the virtual object. As yet another example, irradiance attributes from multiple point light sources are received in the operations 171 and 173 when the virtual object is at the position 2 and/or has the orientation 2. As yet another example, a combined attribute for the virtual object at the position 2 and/or having the orientation 2 is generated in the operation 175 and a target locator is associated with the virtual object at the position 2 and/or the orientation 2. It should be noted that the target locator that is generated for the position 2 and/or the orientation 2 is the same as that for the position 1 and/or the orientation 1 except that an intensity of light incident on the virtual object may have changed when the virtual object is at the position 2 and/or orientation 2. As still another example, pixels and/or vertices of the virtual object are rendered to have the combined attribute when the virtual object is at the position 2 and/or has the orientation 2.

In some embodiments, the changed position is consecutive to the position 1 and the changed orientation is consecutive to the orientation 1.

The method 163 ends after the operation 183.

In some embodiments, the operations 165, 167, 169, 171, 173, 175, 177, 181, and 183 are performed by a processor of a mobile device and the operation 179 is performed by a GPU of the mobile device. In these embodiments, the processor is different than the GPU. For example, the GPU is designated to render an image and the processor performs operations other than rendering an image.

Figure 13A:
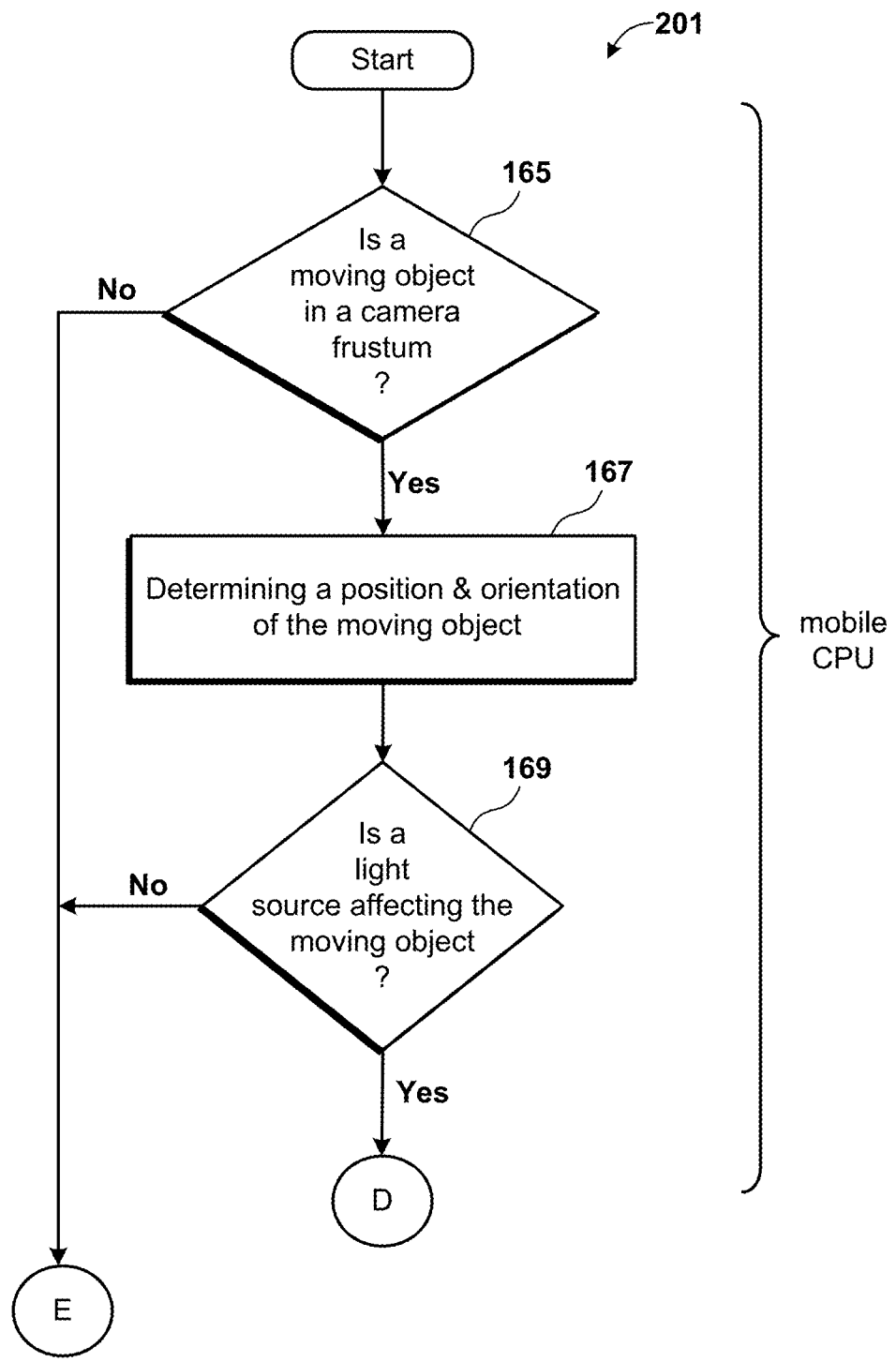
FIG. 13A is a flowchart of a method for approximated diffuse lighting of a virtual object, in accordance with one embodiment described in the present disclosure.
Figure 13B:
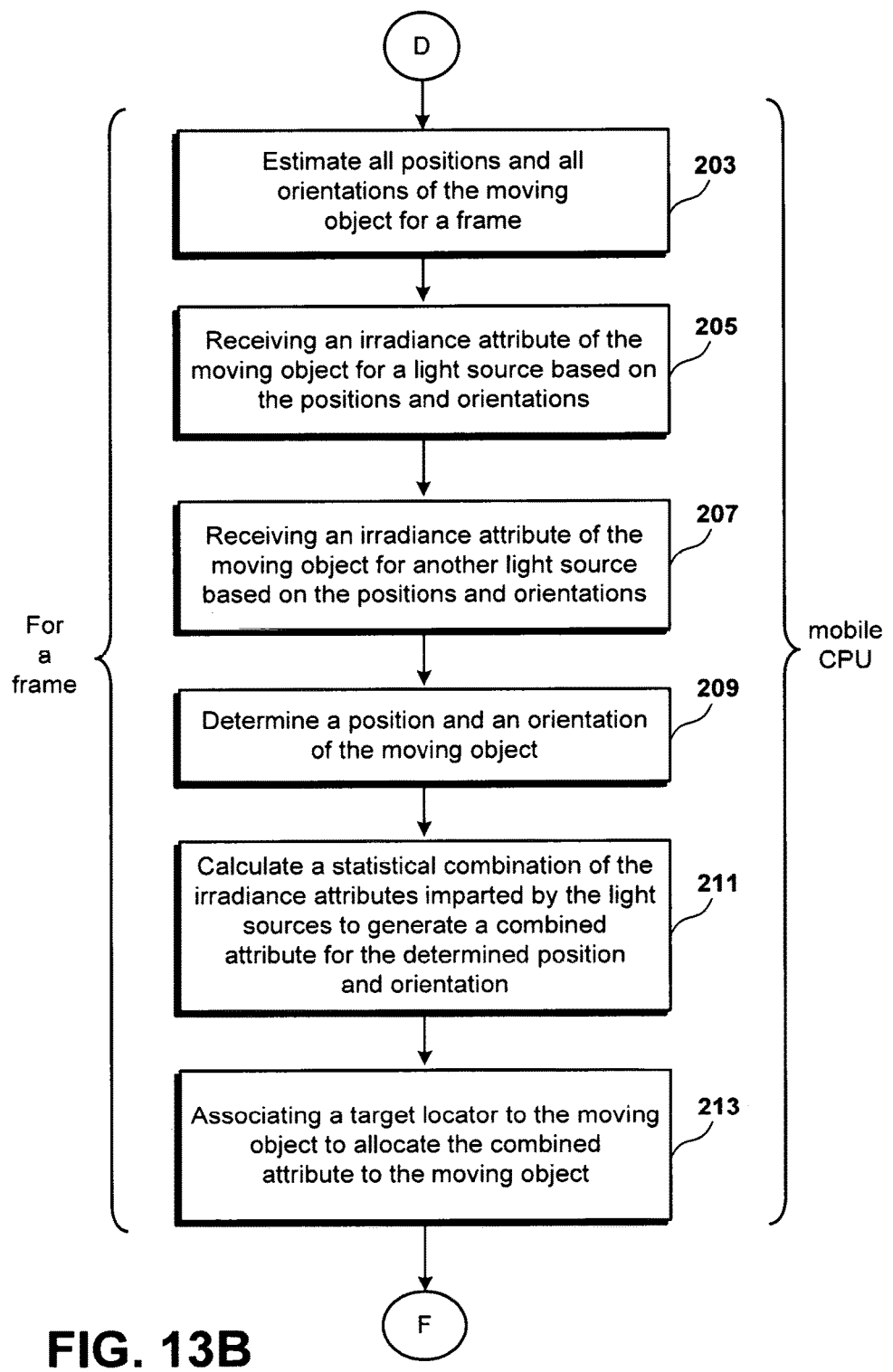
FIG. 13B is a continuation of the flowchart of FIG. 13A, in accordance with one embodiment described in the present disclosure.
Figure 13C:
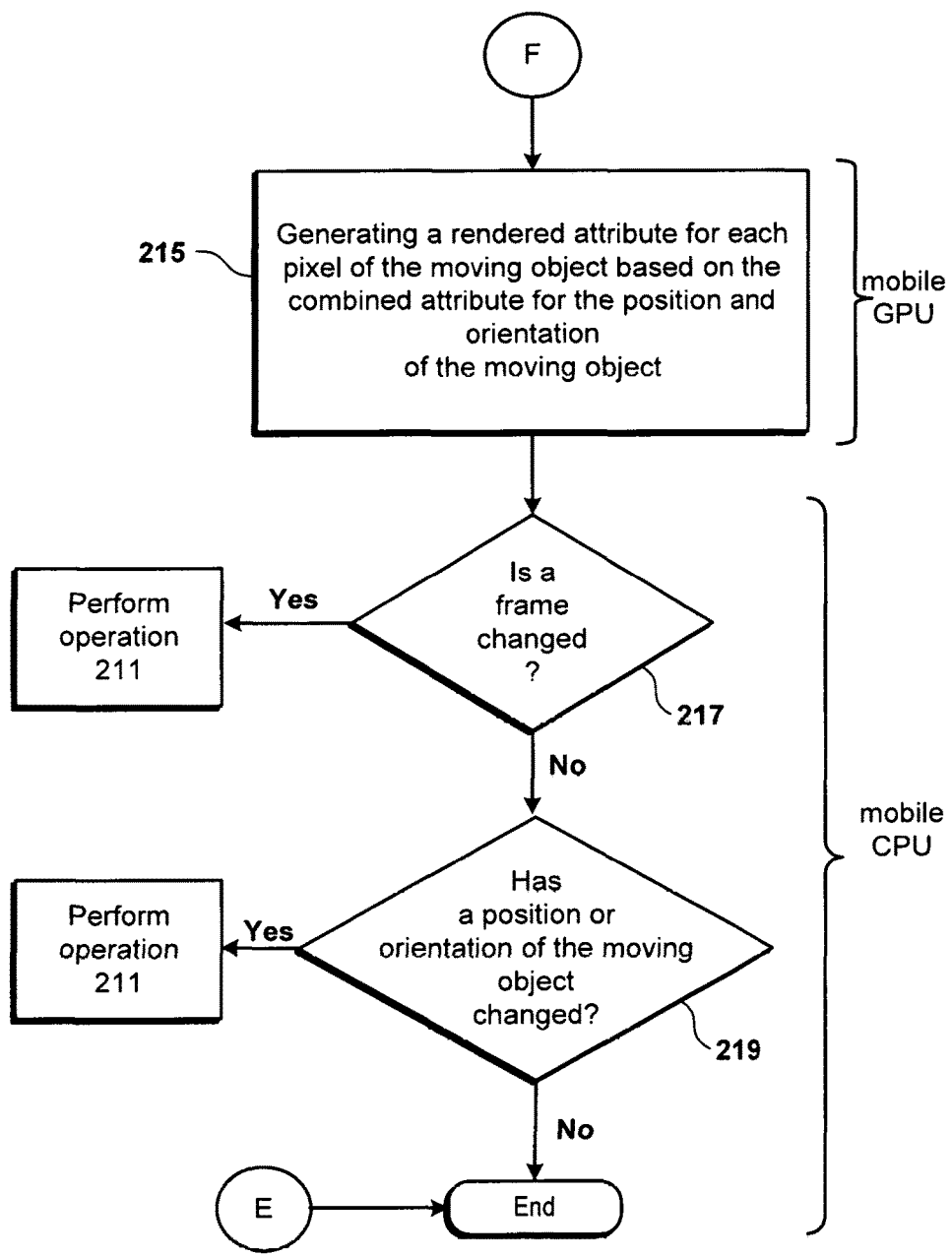
FIG. 13C is a continuation of the flowchart of FIG. 13B, in accordance with one embodiment described in the present disclosure.

FIG. 13A is a flowchart of an embodiment of a method 201 for performing approximated diffuse lighting, FIG. 13B is a continuation of the method 201 of FIG. 13A, and FIG. 13C is a continuation of the method 201 of FIG. 13B.

The method 201 is executed by a processor, e.g., a CPU, etc., or a GPU, or a combination thereof. In the method, the operations 165, 167, and 169 are performed.

Moreover, in an operation 203, all positions and orientations of the virtual object are estimated for a frame. For example, based on a linear velocity and/or a rotational velocity of the moving object, positions and orientations of the moving object are estimated for a frame. As another example, based on a linear velocity and/or a rotational velocity of the moving object in one or more frames, e.g., a frame 0, etc., that precede the frame 1, positions and/or orientations of the moving object within the frame 1 are estimated. As yet another example, any possible position of the virtual object within a frame is an estimated position of the virtual object within the frame and any possible orientation of the virtual object within the frame is an estimated orientation of the virtual object within the frame.

In an operation 205, an irradiance attribute generated from light of a point light source is received for all the estimated positions and/or orientations of the virtual object. The irradiance attribute received in the operation 205 is an attribute that is assigned to pixels or vertices of the virtual object based on light from a point light source, e.g., the point light source 1 (FIG. 4). In some embodiments, the irradiance attribute is received in the operation 205 from the other processor that does not perform the method 201 when the estimated positions and/or orientations are sent to the other processor. The other processor applies the illumination operation (FIG. 4) to determine the irradiance attribute that is attributable to the point light source for all the estimated positions and orientations of the moving object.

In an operation 207, an irradiance attribute generated from light of a point light source, other than the point light source of the operation 205, is received for all the estimated positions and/or orientations of the virtual object. In some embodiments, the irradiance attribute is received in the operation 207 from the other processor that does not perform the method 201 when the estimated positions and/or orientations are sent to the other processor. The other processor applies the illumination operation (FIG. 4) to determine the irradiance attribute that is attributable to the other point light source for all the estimated positions and orientations of the moving object.

In some embodiments, instead of receiving the irradiance attributes in the operations 205 and 207 from the other processor, the irradiance attributes are calculated or identified from a memory device by a processor that performs the method 201.

In an operation 209, a position and/or an orientation of the virtual object is determined. The position of the virtual object determined in the operation 209 is one of the estimated positions and the orientation of the virtual object determined in the operation 209 is one of the estimated orientations.

In an operation 211, a statistical combination of the irradiance attributes received in the operations 205 and 207 for the position and/or orientation determined in the operation 209 is calculated to generate a combined attribute. The statistical combination is calculated in the operation 211 in a manner similar to generating the combined attribute in the operation 175 (FIG. 12B) from the irradiance attributes received in the operations 171 and 173 (FIG. 12B).

Moreover, in an operation 213, a target location is associated with the virtual object to allocate the combined attribute determined in the operation 211 to the virtual object. The operation 213 is performed in a manner similar to performing the operation 177.

Also, in an operation 215, a rendered attribute is generated for each pixel or vertex of the moving object at the position and/or having the orientation determined in the operation 209 based on the combined attribute of the operation 211. The rendered attribute of the operation 215 is generated in a manner similar to generating the rendered attribute of the operation 179 (FIG. 12C). For example, a GPU executes a rendering operation to display the rendered attribute at one or more pixels or one or more vertices of the virtual object. The one or more pixels or the one or more vertices have the combined attribute.

In an operation 217, it is determined whether a frame of the game is changed to a next frame, which is consecutive to a frame for which the operations 165, 167, 169, 203, 205, 209, 211, 213, and 215 of FIGS. 13A, 13B, and 13C are performed. Upon determining that the frame is changed to the next frame, the method 201 repeats at the operation 211. For example, the operations 211, 213, and 215 are performed using the next frame.

On the other hand, in response to determining that the frame is not changed to the next frame, an operation 219 is performed. In the operation 219, it is determined whether a position of the virtual object is changed compared to a position of the moving objection determined in the operation 209 and/or it is determined whether an orientation of the virtual object is changed compared to an orientation of the moving object determined in the operation 209. Upon determining that a position of the virtual object is changed compared to the position of the moving objection determined in the operation 209 and/or upon determining that an orientation of the virtual object is changed compared to the orientation of the moving object determined in the operation 209, the method 201 repeats at the operation 211. For example, the operations 211, 213, and 215 are performed using the changed position and/or the changed orientation. The method 201 ends after the operation 219.

Figures 14, 15:
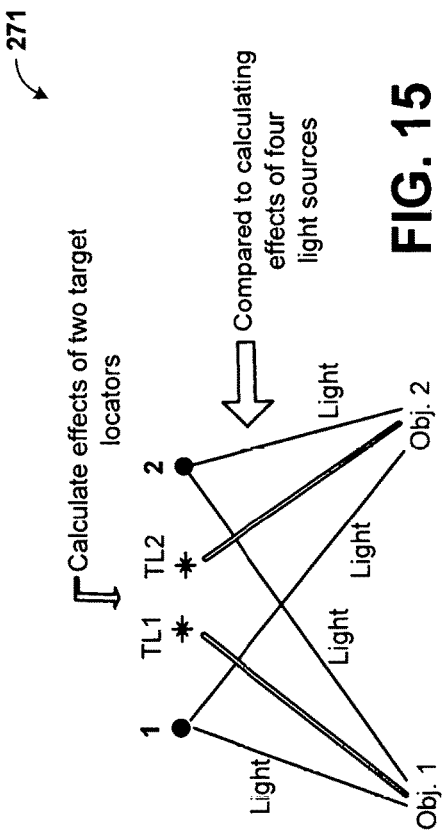
FIG. 14 is a diagram of an operation for illustrating a rendering operation to generate a rendered attribute of at least a portion of a virtual object, in accordance with one embodiment described in the present disclosure.
FIG. 15 is a diagram of a system for illustrating advantages of approximated diffuse lighting, in accordance with one embodiment described in the present disclosure.

FIG. 14 is a diagram of an embodiment of an operation for illustrating a rendering operation to generate a rendered attribute of at least a portion of a virtual object. The rendering operation illustrated in Figure is performed in the operation 179 (FIG. 12B) or in the operation 215 (FIG. 13B). In some embodiments, the rendering operation is performed by a GPU. During the rendering operation, emissive color is extracted from a pixel of the virtual object having a position and an orientation. The emissive color is a color of graphics of the pixel of the virtual object and has an invariable intensity throughout the virtual object. For example, the virtual user 121 in FIG. 1 has an emissive color, e.g., is not shaded, does not have different intensities, etc. As another example, the virtual user 121 is not affected by light from a point light source or from a target locator.

Moreover, during the rendering operation, scaling of the emissive color of a pixel of the virtual object is performed. For example, the emissive color, e.g., "colorlookuprgb", etc., of a pixel is multiplied by two to generate a result and one is subtracted from the result to scale the emissive color. In some embodiments, the emissive color of a pixel is in terms of red, green, blue (RGB) colors. For example, the RGB colors are added together in various ways to reproduce a broad array of colors. In various embodiments, the emissive color of a pixel is expressed in a different format, e.g., a YIQ format for National Television System Committee (NTSC), a $YD_BD_R$ format for Phase Alternating Line (PAL) encoding system, a YPbPR format for Sequential Color with Memory (SECAM), etc.

It should be noted that instead of multiplying the emissive color with two, any other real number, e.g., three, four, etc., is used for the multiplication. Moreover, in some embodiments, instead of subtracting one from the result of the multiplication, any other real number, e.g., two, three, etc., is subtracted from the result.

Moreover, in the rendering operation, the scaled emissive color of a pixel is multiplied with a product of an irradiance attribute of the pixel generated from the illumination operation of FIG. 4 and a weighted attribute of the pixel of the virtual object to generate an output. The output is added to the emissive color extracted from the pixel to generate a rendered attribute for the pixel of the virtual object at a position and has an orientation. The weighted attribute of the pixel is the weighted sum for the pixel of the virtual object, as described above in FIG. 6.

In various embodiments, the irradiance attribute of the pixel used in the rendering operation is a weighted product of irradiance attributes from all point light sources within a camera frustum for the pixel. For example, the irradiance attribute of the pixel is equal to product of a weight multiplied by an irradiance attribute value at the pixel attributable to light generated by a first point light source and a weight multiplied by an irradiance attribute value at the pixel attributed to light generated by a second point light source.

The rendering operation is repeated for all pixels of the virtual object to display the virtual object having approximated diffuse lighting.

In some embodiments, instead of generating the rendered attribute for each pixel of the virtual object, the rendered attribute is generated for each vertex of the virtual object. For example, instead of the weighted attribute for a pixel, weighted attribute for a vertex of the virtual object is used, instead of calculating an irradiance attribute of the pixel of the virtual object, irradiance attribute of the vertex of the virtual object is calculated, and instead of extracting emissive color from the pixel of the virtual object, emissive color is extracted from the vertex. In these embodiments, the irradiance attribute of a vertex of the virtual object is bleeded, e.g., copied, etc., to neighboring pixels of the virtual object to provide irradiance attributes to the neighboring pixels.

In some embodiments, a pixel of the virtual object is a neighboring pixel of a vertex of the virtual object when the pixel is within a pre-determined distance, e.g., adjacent to, etc., of the vertex.

It should be noted that the rendering operation saves time and cost associated with processing to render a virtual object exhibiting an irradiance attribute. The time and cost is saved when the weighted attribute is used for the target locator within a camera frustum rather than using attributes for all point light sources within the camera frustum. When the rendering operation is to be performed for all point light sources, the rendering operation is repeated for each point light source. This adds to time and cost of performing the rendering operation for all the point light sources. Moreover, the time and cost is saved when a low number of arithmetic operations, e.g., two multiplication operations, one addition operation, etc., are performed.

FIG. 15 is a diagram of an embodiment of a system 271 for illustrating advantages of approximated diffuse lighting. Instead of calculating effects of multiple light sources, e.g., point light source 1 and point light source 2, etc., on a virtual object 1 and on a virtual object 2, an effect of a target locator TL1 that is associated with the virtual object 1 and with the point light sources 1 and 2 on the virtual object 1 is calculated. Moreover, an effect of a target locator TL2 that is associated with the virtual object 2 and with the point light sources 1 and 2 on the virtual object 2 is calculated. It is less time consuming and less computationally expensive to determine the effect of the target locator TL1 on the virtual object 1 and the effect of the target locator TL2 on the virtual object 2 than to determine the effects of the point light source 1 on the virtual object 1, the point light source 2 on the virtual object 2, the point light source 1 on the virtual object 2, and the point light source 2 on the virtual object 2. For example, when the target locators TL1 and TL2 are used, two passes of the rendering operation of FIG. 14 are performed by a processor for determining an irradiance attribute value of a pixel of the virtual object 1 and an irradiance attribute value of a pixel of the virtual object 2. Comparatively, when the point light sources 1 and 2 are used, four passes of a rendering operation, e.g., one pass for the point light source 1 and a pixel of the virtual object 1, a second pass for the point light source 2 and the pixel of the virtual object 1, a third pass for the point light source 1 and a pixel of the virtual object 2, and a fourth pass for the point light source 2 and the pixel of the virtual object 2, are performed.

Figure 16:
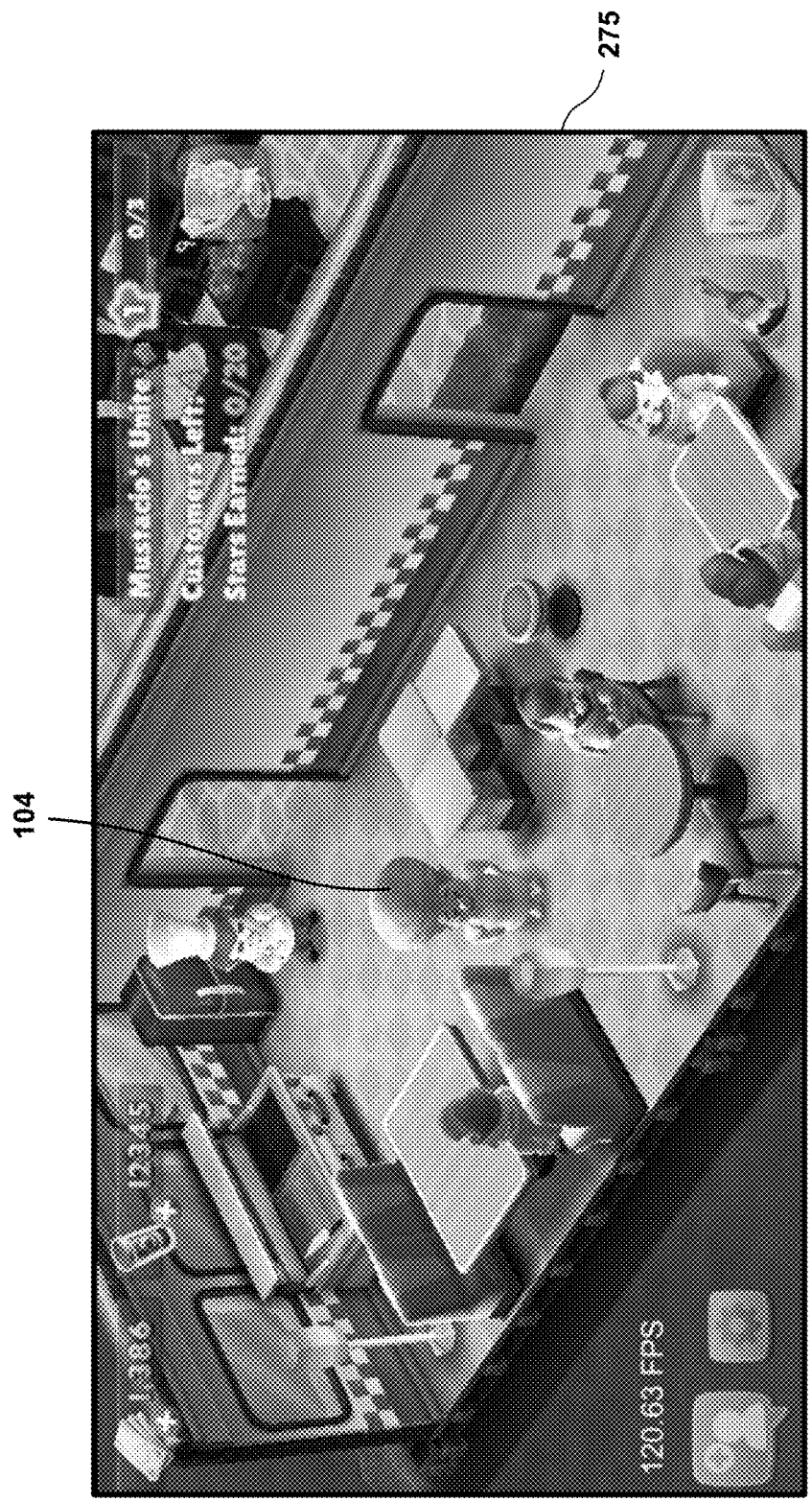
FIG. 16 is a diagram of a game in which one or more virtual objects have approximated diffuse lighting, in accordance with one embodiment described in the present disclosure.

FIG. 16 is a diagram of an embodiment of a game 275 in which one or more virtual objects have approximated diffuse lighting. The game 275 is similar to the game 120 (FIG. 1) except in the game 275, one or more virtual objects have irradiance attribute values assigned to them by a processor by applying the weighted sum and by applying the rendering operation of FIG. 14. For example, a virtual user 104 of the game 275 is the same as the virtual user 121 (FIG. 1) of the game 120 except that the virtual user 104 has light shading and the virtual user 121 lacks any light shading.

Figure 17A:
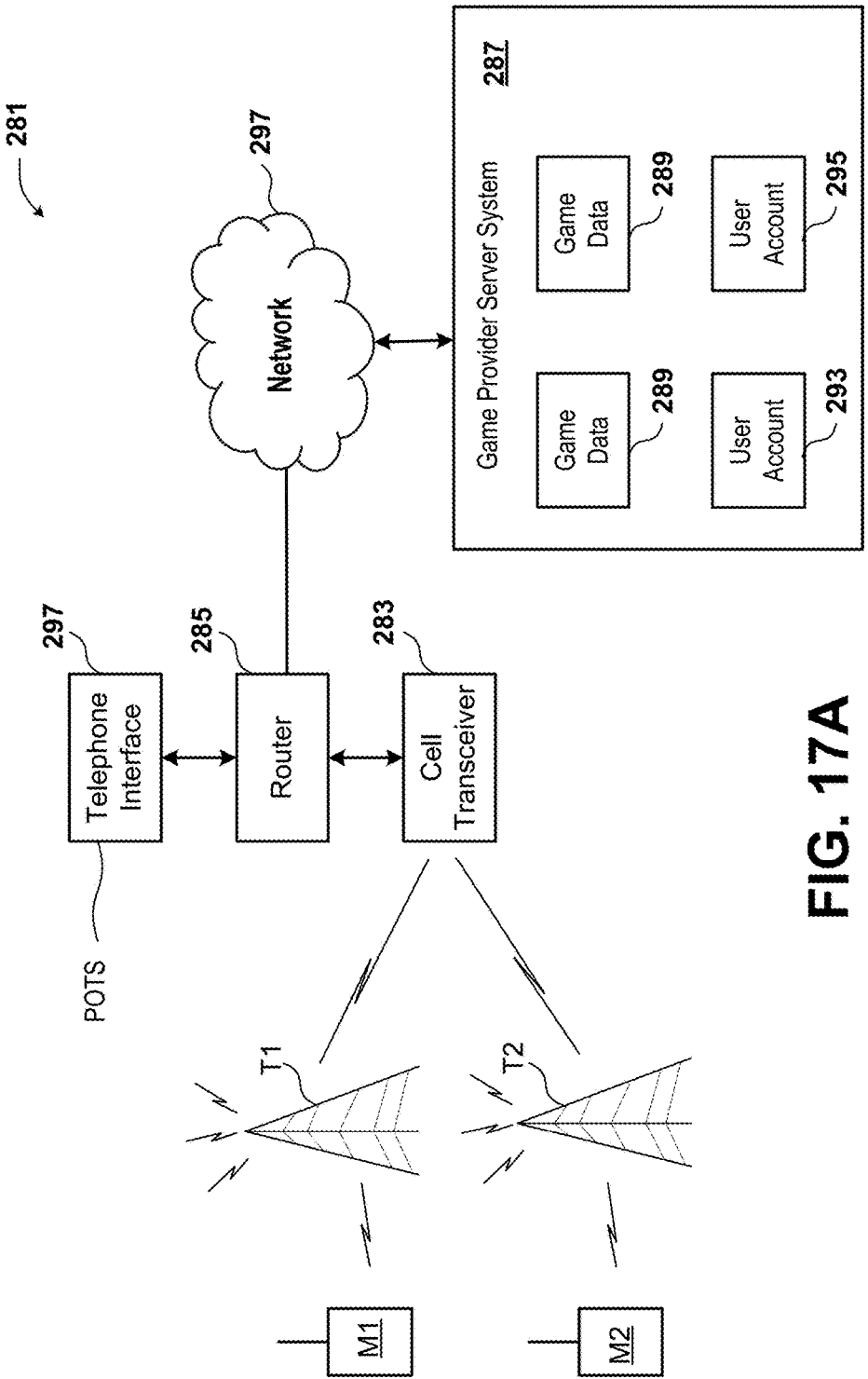
FIG. 17A is a diagram of a system for communicating with a number of mobile devices, in accordance with one embodiment described in the present disclosure.

FIG. 17A is a diagram of an embodiment of a system 281 for communicating to a number of mobile devices M1 and M2. Examples of a mobile device includes a cell phone, a smart phone, a tablet, a personal digital assistant (PDA), etc. For example, both mobile devices M1 and M2 are web-enabled phones. Each mobile device M1 and M2 has an Internet Protocol (IP) address that identifies the mobile devices within a network 297, e.g., the Internet, an Intranet, a local area network, a wide area network, etc.

The mobile devices M1 and M2 include transceivers that couple the mobile devices via radio frequency (RF) transmissions to one or more cellular towers T1 and T2. The cellular towers T1 and T2 are coupled via an RF transceiver 283 to a router 285. The router 285 is coupled via the network 297 to a game provider server system (GPSS) 287. The GPSS 287 includes a number of servers. In some embodiments, a server includes a processor and a memory device. In several embodiments, the GPSS 287 includes a number of virtual machines (VMs) that work in conjunction with a hypervisor.

The router 285 is coupled to a plain old telephone service (POTS) via a telephone company interface 297 to communicate voice of users between mobile devices. In some embodiments, instead of or in addition to POTS, another service, e.g., Voice over IP (VoIP), Integrated Services Digital Network (ISDN), etc., is used to communicate voice between mobile devices.

The GPSS 287 includes game data 289 and 291 for playing various games, e.g., the game 120 (FIG. 1), the game 275 (FIG. 16), etc. Game data includes rules of playing a game or graphics of the game or a combination thereof, etc. Each user has a user account, e.g., a game account, a social network account, etc., that is accessed by the user to play a game. For example, a first user logs into a user account 293 by providing information regarding himself/herself on a mobile device to access the game data 289 or game data 291. As another example, a second user logs into a user account 295 by providing information regarding himself/herself on a mobile device to access the game data 289 or game data 291.

Information regarding a user is received from a mobile device via one or more of the cell towers T1 and T2, the RF transceiver 283, the router 285, and the network 297. In some embodiments, the router 285 routes information received from the cell transceiver 283 to a server that is identified by an Internet Protocol (IP) address.

When the information that is received from a user is authenticated by an authentication server within or outside the GPSS 287, game data 289 or game data 291 is transferred, e.g., streamed, packetized and sent, etc., along with an identification of a mobile device within the network 297 via the network 297 to the router 285. The router 285 determines based on an identification of a mobile device to route game data to the mobile device M1. Upon receiving the game data 289 or the game data 291, a user plays a game that is rendered by a GPU of the mobile device M1 on a display screen of the mobile device M1.

In various embodiments, a processor and/or a GPU of the mobile device M1 applies the rendering operation of FIG. 14 to the game data 289 or the game data 291 received via the network 297 to provide an intensity to a virtual object of a game.

In some embodiments, each mobile device has an operating system, e.g., an Android™ operating system, iOS™ operating system from Apple™ Inc., etc. Moreover, in these embodiments, each mobile device is capable of executing a number of computer software applications, e.g., a global position service (GPS) application, a notepad application, a web browser application, a social network application, a game access application, a game play application, etc., on top of the operating system.

In several embodiments, the operations that are described with reference to FIGS. 12A-12C and 13A-13C and the rendering operation of FIG. 14 are performed by one or more processors of a client device, e.g., a mobile device, etc. In some embodiments, the operations that are described with reference to FIGS. 12A-12C and 13A-13C and the rendering operation of FIG. 14 are performed by one or more servers of the GPSS 287. In various embodiments, the operations that are described with reference to FIGS. 12A-12C and 13A-13C and the rendering operation of FIG. 14 are performed by a combination of a number of servers of the GPSS 287 and a number of processors of a client device.

In several embodiments, the operations described in the present disclosure are performed by one or more processors of a client device. In some embodiments, the operations described in the present disclosure are performed by one or more servers of the GPSS 287. In various embodiments, the operations described in the present disclosure are performed by a combination of a number of servers of the GPSS 287 and a number of processors of a client device.

Figure 17B:
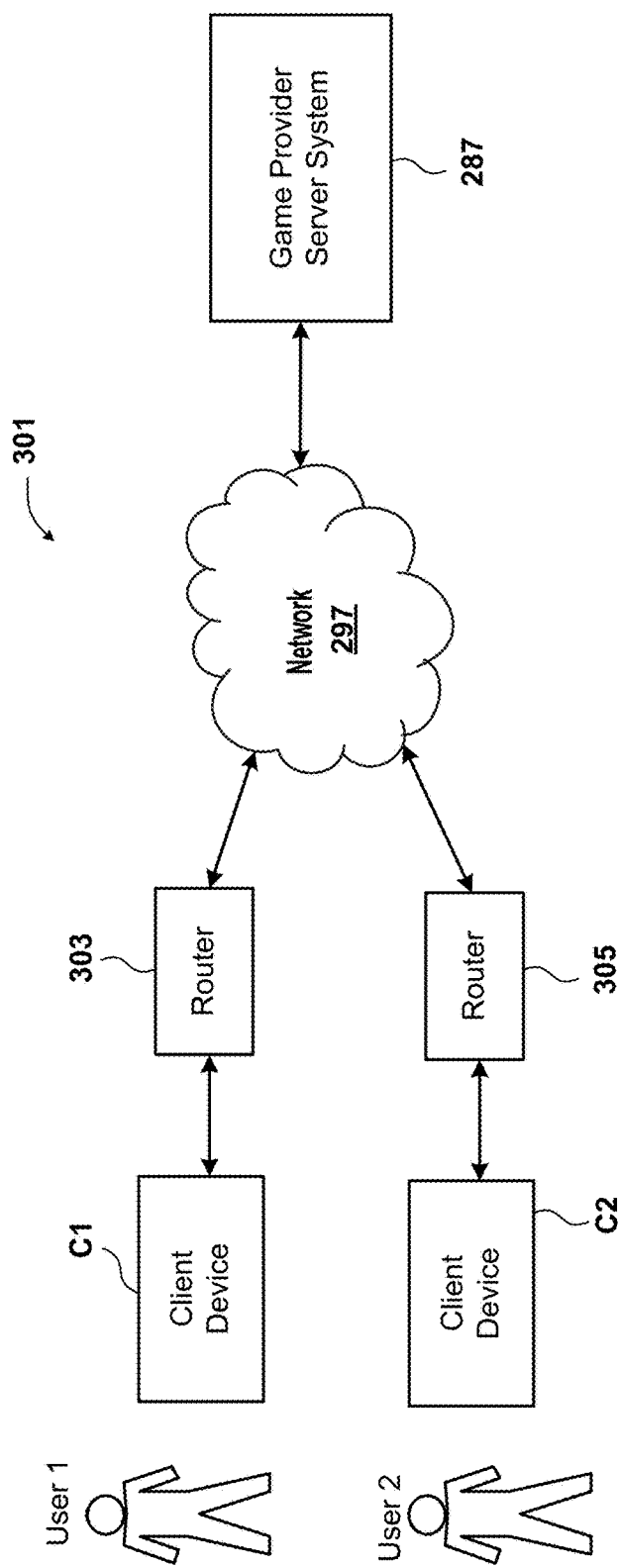
FIG. 17B is a diagram of a system for communicating data between a client device and a server system via a network and a router and communicating data between another client device and the server system via the network and a router, in accordance with one embodiment described in the present disclosure.

FIG. 17B is a diagram of an embodiment of a system 301 for communicating data between a client device C1 and the GPSS 287 via the network 297 and a router 303 and communicating data between a client device C2 and the GPSS 287 via the network 297 and a router 305. The mobile device M1 (FIG. 17A) is an example of the client device C1 and the mobile device M2 (FIG. 17A) is an example of the client device C2. Other examples of a client device include a game console, a desktop computer, a laptop computer, a smart television, etc.

A user 1 communicates with the GPSS 287 after logging into his/her user account via the client device C1. Similarly, a user 2 communicates with the GPSS 287 after logging into his/her user account via the client device C2. The router 303 routes, e.g., directs, etc., communication between the client device C1 and the GPSS 287 and the router 305 routes communication between the client device C2 and the GPSS 287. For example, the router 303 identifies the client device C1 based on an address of the client device C1 received from the GPSS 287. As another example, the router 303 identifies a server of the GPSS 287 based on an address of the server received from the client device C1.

In some embodiments, instead of two routers 303 and 305, one router or another number of routers is used to communication information, e.g., game data, user information, etc., between the client devices C1 and C2 and the GPSS 287.

Figure 18A:
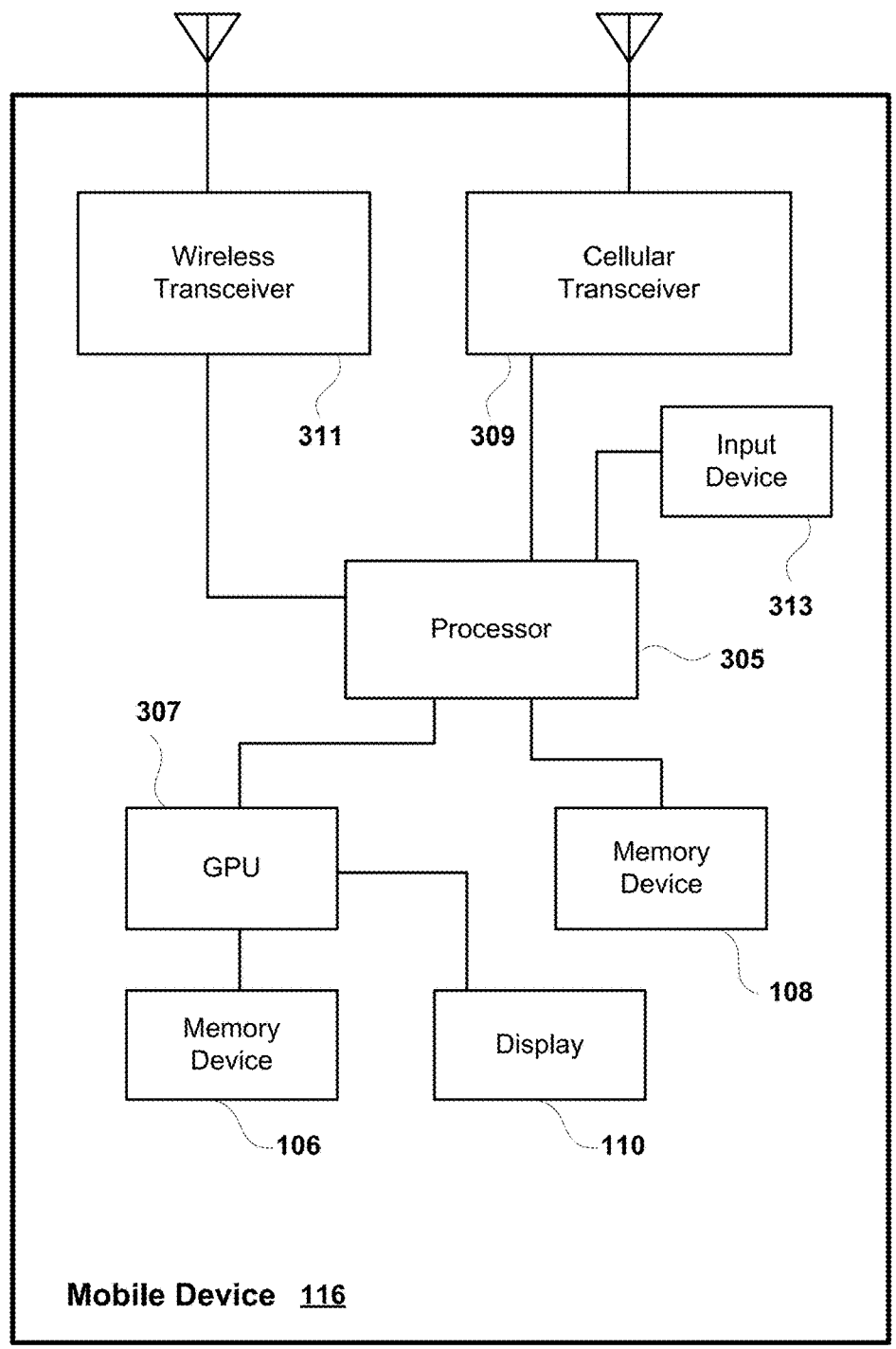
FIG. 18A is a diagram of a mobile device, in accordance with one embodiment described in the present disclosure.

FIG. 18A is a diagram of an embodiment of a mobile device 116, which is an example of any of the mobile devices M1 and M2 (FIG. 17A). The mobile device includes a processor 305, a memory device 108, a GPU, a memory device 106, a display device 110, a cellular transceiver 309, a wireless transceiver 311, and an input device 313. Examples of the input device 313 include a touchscreen display, a game controller, a handheld controller, a keypad, a keyboard, a button, etc. The input device 313 is used to receive user input, e.g., game input to play a game, game input to move a virtual object from one position to another, game input for moving a virtual object from one orientation to another, user information to access the game, phone numbers, information to unlock the mobile device 116, tap to start a web browser, web addresses, tap to close a window, user password, username, etc., from a user. Example of the display device 110 include an LED display device, an LCD display device, a plasma display device, etc. A display device includes a display screen.

The wireless transceiver 311 enables communication of the processor 305 with a router. For example, the wireless transceiver 311 executes a Bluetooth protocol, a wireless communication protocol, etc., to communicate data, e.g., voice data, digital data, Internet data, web data, etc., with a router. The cellular transceiver 309 establishes communication with a cell tower to transfer voice data between mobile devices.

The GPU 307 executes the rendering operation of FIG. 14 to render a virtual object on the display device 110. Moreover, the GPU 307 processes game data to render a game for display on the display device 110. The memory device 106 stores image data for displaying, e.g., rendering, etc., frames of data.

The memory device 108 stores an operating system, computer-software applications, etc.

In some embodiments, instead of or in addition to the display device 110, a tactile feedback device is used to provide tactile feedback to a user. As an example, the tactile feedback is provided when someone calls a user of the mobile device 116, when the user receives a computer software notification, when a computer software reminder becomes active, when the user achieves a result in a game, etc.

Figure 18B:
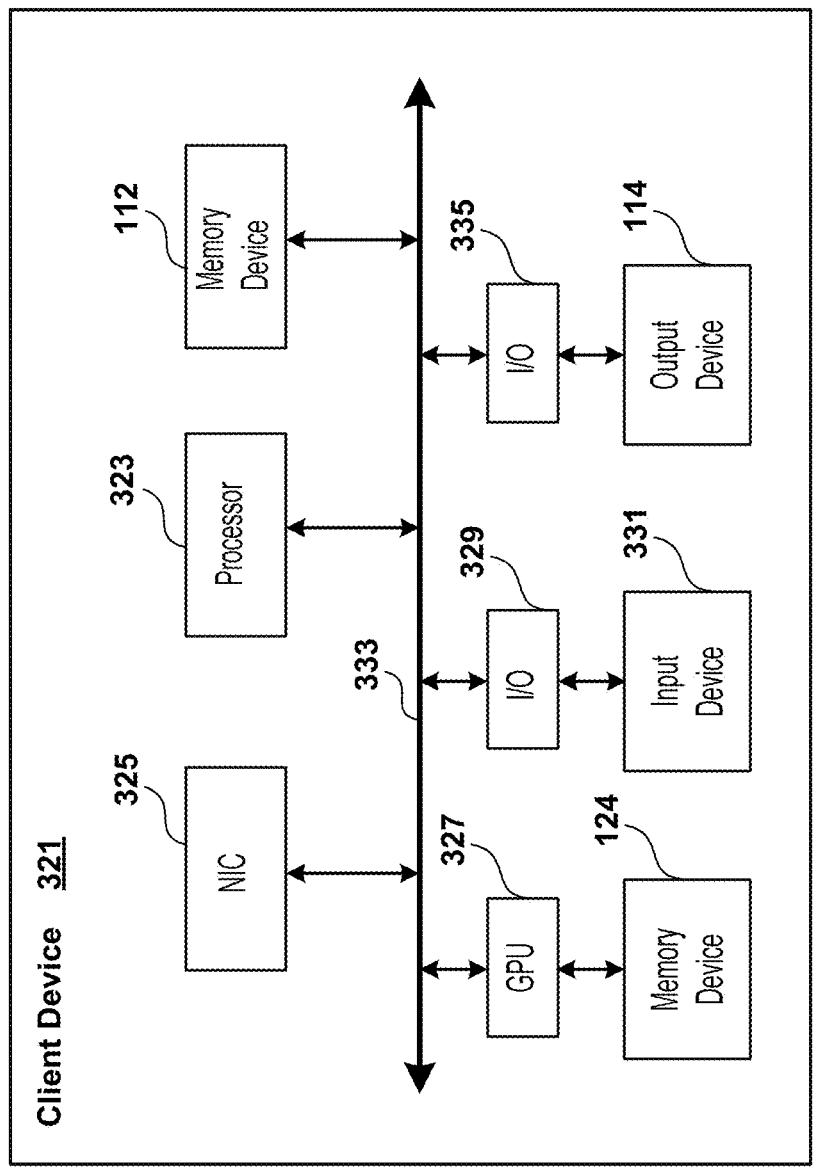
FIG. 18B is a block diagram of a client device for playing a game, in accordance with one embodiment described in the present disclosure.

FIG. 18B is a block diagram of an embodiment of a client device 321 for playing a game. The client device 321 includes a processor 323, a memory device 112, a network interface controller (NIC) 325, a GPU 327, a memory device 124, an input/output (I/O) interface 329, an input device 331, an I/O interface 333, and an output device 114. The processor 323, the memory device 112, the NIC 325, the GPU 327, the memory device 124, the I/O interface 329, the I/O interface 335, and the output device 114 are coupled with each other via a bus 333. Examples of the input device 331 include a mouse, a keyboard, a trackball, a button, a stylus, etc. Examples of the output device 114 include a display device, a speaker, a tactile feedback device, or a combination thereof. Examples of a display device include an LCD, an LED, a cathode ray tube, a plasma display, etc. Examples of the NIC 325 include a network interface card, a network adapter, etc.

Examples of an I/O interface include an interface that provides compatibility between pieces of hardware coupled to the interface. For example, the I/O interface 329 converts a signal received from the input device 331 into a form, amplitude, and/or speed compatible with the bus 333. As another example, the I/O interface 335 converts a signal received from the bus 333 into a form, amplitude, and/or speed compatible with the output device 114.

Figure 18C:
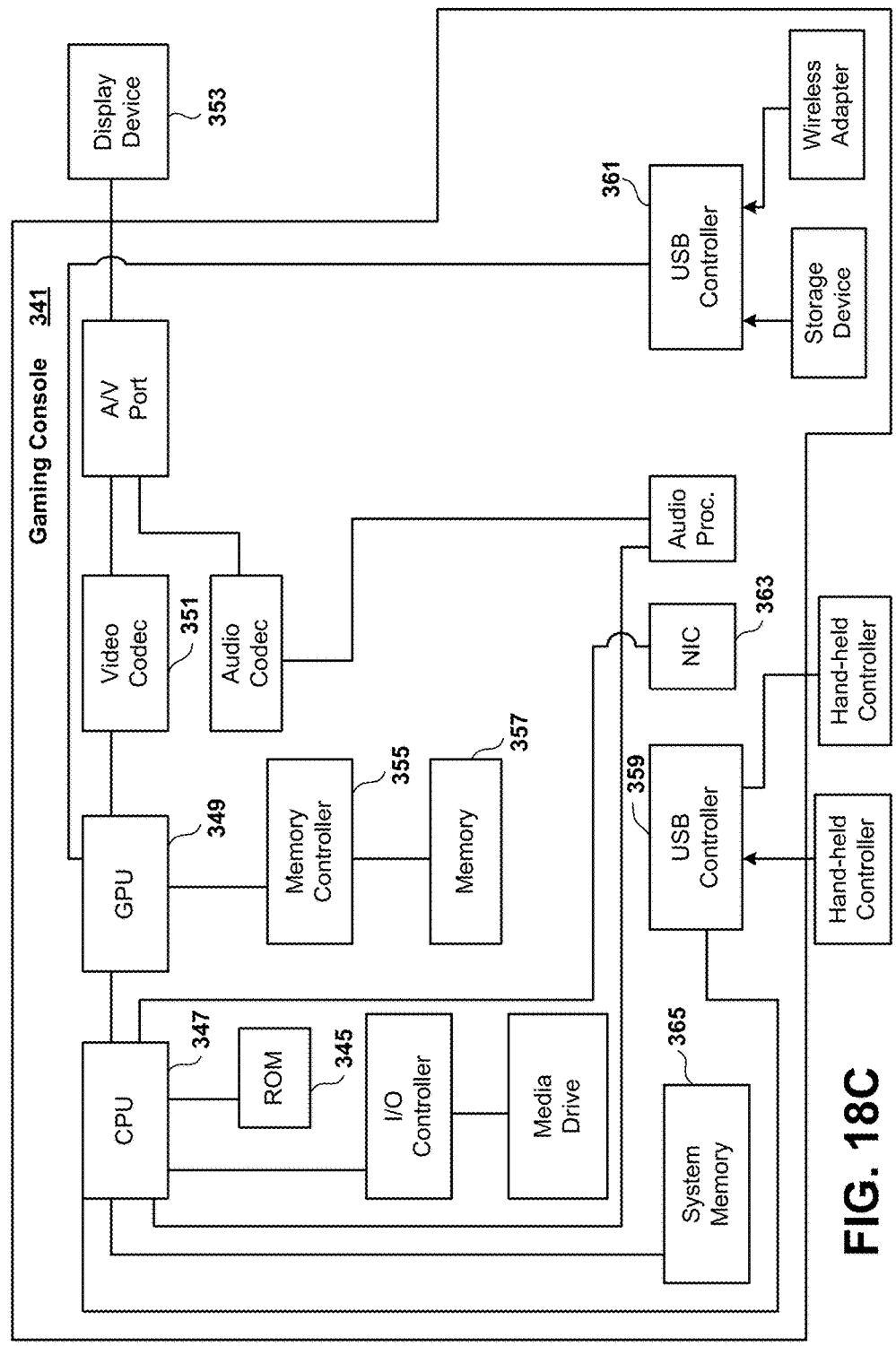
FIG. 18C is a diagram of a gaming console, in accordance with one embodiment described in the present disclosure.

FIG. 18C is a diagram of an embodiment of a gaming console 341, which is an example of a client device. The gaming console 341 includes a ROM 345, which is coupled to a CPU 347 to temporarily store data. The ROM 345 stores an executable computer software program that is loaded during a boot process of the gaming console 341.

A GPU 349 and a video codec 351 are used to display a game on a display device 353. For example, the GPU 349 converts bits of data into image data and the video codec 351 compresses or decompresses the image data for display on a display device 353, e.g., a television, an LED device, an LCD device, a cathode ray tube display device, a plasma display device, etc.

The video codec 351 outputs image data via an audio/video port for transmission to the display device 353. A memory controller 355 is connected to the GPU 349 to allow the GPU 349 to access a memory device 357 in which game data is stored.

The gaming console 341 includes a Universal Serial Bus (USB) controller 359 that acts as a host for hand-held controllers. Moreover, the gaming console 341 includes another USB controller 361 that acts as a host for a storage device, e.g., a memory device, etc., and for a wireless adapter. Moreover, the CPU 347 is coupled to a NIC 363. The NIC 363 and the wireless adapter provide access to the network 297 (FIGS. 17A, 17B). Examples of the NIC 363 include an Ethernet card, a modem, etc. Examples of the wireless adapter include a Bluetooth module.

A system memory 365 is provided to store application data that is loaded during the boot process. The CPU 347 receives game data that is recorded on a memory device, e.g., a digital video disc, a compact disc, removable media, etc. after the memory device is received within a media drive and read by an I/O controller. The GPU 347 processes the game data and provides the game data to the GPU 349 for display of a game on the display device 353. In some embodiments, the media drive includes a hard disk drive.

The CPU 347 sends commands to control an audio processor that further controls an audio codec. The audio processor transforms bits of data into sound data, which is compressed or decompressed by the audio codec. In some embodiments, the audio processor synchronizes game data with sound data. The audio codec outputs sound data via the audio/video port to speakers of the display device 353 or to external speakers. The speakers convert sound data into sound signals that are audible to a user during play of a game.

Although the above-described operations are described with reference to a moving virtual object, in some embodiments, the operations apply to a nonmoving object within the game 120.

Embodiments described in the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

With the above embodiments in mind, it should be understood that the embodiments can employ various computer-implemented operations involving data stored in computer systems. These operations are those requiring physical manipulation of physical quantities. Any of the operations described herein are useful machine operations. The present disclosure also relates to a device or an apparatus for performing these operations. The apparatus can be specially constructed for a specific purpose. The apparatus is selectively activated or configured by a computer program stored in the computer.

In one embodiment, a module, as used herein, is embodied as computer-readable code on a non-transitory computer-readable medium. The computer-readable medium is any data storage device, e.g., a memory device, etc., that can store data, which can be thereafter be read by a computer. Examples of the computer-readable medium include hard drives, network attached storage (NAS), ROM, random-access memory, compact disc-ROMs (CD-ROMs), CD-recordables (CD-Rs), CD-rewritables (RWs), magnetic tapes and other optical and non-optical data storage devices. The computer-readable medium can include computer-readable tangible medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or operations may be adjusted so they occur in a different order than that shown in the Figures, or may be distributed in a system which allows the occurrence of the processing operations at various intervals associated with the processing, as long as the processing of the overlay operations are performed in the desired way. For example, the operation 183 of FIG. 12C is performed before the operation 181 of FIG. 12C.

In some embodiments, any embodiments described above are combined with one or more of the remaining embodiments described above.

Although the foregoing disclosure is described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A method for performing a rendering operation for a combined irradiance attribute associated with a plurality of light sources, comprising:

determining a plurality of estimated positions and a plurality of estimated orientations of a moving object;

receiving a first irradiance attribute imparted by a first light source from the plurality of light sources to a portion of the moving object, the first irradiance attribute generated based on one of the estimated positions and one of the estimated orientations;

receiving a second irradiance attribute imparted by a second light source from the plurality of light sources to the portion of the moving object, the second irradiance attribute generated based on the one of the estimated positions and the one of the estimated orientations;

determining that the moving object is at a current position that matches the one of the estimated positions and has a current orientation that matches the one of the estimated orientations, wherein the moving object is at the current position and at the current orientation within a frame, wherein the frame includes a game space of a game;

applying a statistical operation to the first irradiance attribute and the second irradiance attribute to generate a combined irradiance attribute for the current position and the current orientation;

replacing the first and second light sources within the game space with a combined light source to impart the combined irradiance attribute to the portion of the moving object at the current position and at the current orientation;

generating a rendered attribute for the portion of the moving object at the current position and the current orientation from the combined irradiance attribute imparted by the combined light source, wherein the rendered attribute for the portion of the moving object is not affected by an additional combined light source that illuminates a portion of an additional moving object and an additional rendered attribute for the portion of the additional moving object is not affected by the combined light source, wherein the additional moving object is displayed within the game space of the game.

2. The method of claim 1, further comprising:

determining whether the frame in which the moving object is displayed has changed; and deleting the combined irradiance attribute from a memory device in response to determining that the frame in which the moving object is displayed has changed.

3. The method of claim 2, further comprising repeating the method when the frame changes.

4. The method of claim 1, wherein the portion of the moving object includes a number of pixels of a display device occupied by the moving object.

5. The method of claim 1, wherein the portion of the moving object includes one or more vertices of the moving object, wherein the first and second light sources are hidden within the game space of the game.

6. The method of claim 1, wherein the method is executed a mobile gaming device.

7. The method of claim 1, further comprising displaying the moving object having the rendered attribute in a mobile gaming device.

8. The method of claim 1, wherein the first irradiance attribute includes an intensity imparted by the first light source to a pixel of the moving object, or a color imparted by the first light source to the pixel, or a direction in which light from the first light source is incident on the pixel, or a distance between the first light source and the pixel, wherein the second irradiance attribute includes an intensity imparted by the second light source to the pixel of the moving object, or a color imparted by the second light source to the pixel, or a direction in which light from the second light source is incident on the pixel, or a distance between the second light source and the pixel.

9. The method of claim 1, wherein the statistical operation includes a weighted combination of the first irradiance attribute and the second irradiance attribute, or an average of the first irradiance attribute and the second irradiance attribute, or a variance of the first irradiance attribute and the second irradiance attribute, or a standard deviation of the first and second irradiance attributes.

10. The method of claim 1, wherein the game space includes a scene of the game.

11. The method of claim 1, further comprising rendering the moving object with the rendered attribute in the game space.

12. A method for performing a rendering operation for a combined irradiance attribute associated with a plurality of light sources, comprising:

sending for display at a first position a moving object in a game on a computing device;

determining a plurality of estimated positions of the moving object;

receiving a first irradiance attribute imparted by a first light source from the plurality of light sources to the moving object, the first irradiance attribute generated based on one of the estimated positions;

receiving a second irradiance attribute imparted by a second light source from the plurality of light sources to the moving object, the second irradiance attribute generated based on the one of the estimated positions;

determining that the moving object has moved to a second position from the first position;

determining that the second position matches the one of the estimated positions;

applying a statistical operation to the first irradiance attribute and the second irradiance attribute to generate the combined irradiance attribute for the second position;

replacing the first and second light sources within the game with a combined light source to impart the combined irradiance attribute to the moving object at the second position;

applying a rendered intensity of light incident on the moving object when the moving object is at the second position, wherein the rendered intensity is generated based on the combined irradiance attribute;

wherein the moving object is illuminated with the combined light source displayed within the game when the moving object is at the second position, wherein the combined light source combines light intensities from the first and second light sources to illuminate the moving object, wherein an additional moving object is illuminated by an additional combined light source displayed within the game, wherein the additional combined light source displayed within the game generates light incident on the additional moving object, wherein the rendered intensity of light for the moving object is not affected by the additional combined light source and an additional rendered intensity of light for the additional moving object is not affected by the combined light source.

13. The method of claim 12, wherein the moving object has an image of a user within the game, or an image of an animal within the game, or an image of a nonliving thing within the game.

14. The method of claim 12, wherein the computing device comprises a mobile device, wherein the mobile device includes a cell phone, or a tablet, or a laptop.

15. The method of claim 12, wherein the moving object moves to the second position when an indication is received from a game controller to move to the second position.

16. The method of claim 12, wherein an increase in the light intensities increases an amount of color imparted to the moving object and a decrease in the light intensities decreases the amount of color.

17. The method of claim 12, wherein the combined light source is generated based on a weighted combination of the light intensities imparted to the moving object by the plurality of light sources.

18. A method for performing a rendering operation for a combined irradiance attribute of a plurality of light sources, comprising:

sending for display at a first orientation a moving object in a game on a mobile device;

determining a plurality of estimated orientations of the moving object;

receiving a first irradiance attribute imparted by a first light source from the plurality of light sources to the moving object, the first irradiance attribute generated based on one of the estimated orientations;

receiving a second irradiance attribute imparted by a second light source from the plurality of light sources to the moving object, the second irradiance attribute generated based on the one of the estimated orientations;

determining that the moving object has changed to a second orientation from the first orientation;

determining that the second orientation matches the one of the estimated orientations;

applying a statistical operation to the first irradiance attribute and the second irradiance attribute to generate the combined irradiance attribute for the second orientation;

replacing the first and second light sources within the game with a combined light source to impart the combined irradiance attribute to the moving object at the second orientation; and applying a rendered intensity of light incident on the moving object when the moving object is at the second orientation, wherein the moving object is illuminated by the combined light source displayed within the game when the moving object is at the second orientation, wherein the combined light source displayed within the game combines light intensities from the first and second light sources, wherein an additional moving object is associated with an additional combined light source displayed within the game, wherein the rendered intensity of light on the moving object is not affected by the additional combined light source and an additional rendered intensity of light for the additional moving object is not affected by the combined light source.

19. The method of claim 18, wherein the moving object has the second orientation when an indication is received from a game controller to change an orientation of the moving object to the second orientation.

20. A method for performing a rendering operation for a combined irradiance attribute associated with a plurality of light sources, comprising:

identifying whether a moving object is within a frustum of a camera associated with a game space of a game, wherein the moving object has a current position and a current orientation;

determining a plurality of estimated positions and a plurality of estimated orientations of the moving object;

receiving a first irradiance attribute imparted by a first light source from the plurality of light sources to a portion of the moving object, the first irradiance attribute generated based on one of the estimated positions and one of the estimated orientations;

receiving a second irradiance attribute imparted by a second light source from the plurality of light sources to the portion of the moving object, the second irradiance attribute generated based on the one of the estimated positions and the one of the estimated orientations;

determining that the current position matches the one of the estimated positions and the current orientation matches the one of the estimated orientations;

applying a statistical operation to the first irradiance attribute and the second irradiance attribute to generate the combined irradiance attribute for the current position and the current orientation, wherein the combined irradiance attribute is imparted to the portion of the moving object by a combined light source displayed in the game space of the game;

generating a rendered attribute for the portion of the moving object from the combined irradiance attribute imparted by the combined light source; and replacing the first and second light sources within the game space of the game with the combined light source; and illuminating an additional portion of the moving object with the combined light source when the current orientation of the moving object changes, wherein the rendered attribute for the portion of the moving object is not affected by an additional combined light source that illuminates a portion of an additional moving object and an additional rendered attribute for the portion of the additional moving object is not affected by the combined light source for the portion of the moving object, wherein the additional moving object is displayed within the game space of the game.

21. The method of claim 20, wherein the frustum of the camera defines whether a scene of the game includes the moving object.

22. The method of claim 20, wherein the portion of the moving object is affected by the first light source when light from the first light source is incident on the portion of the moving object, wherein the portion of the moving object is affected by the second light source when light from the second light source is incident on the portion of the moving object.

23. The method of claim 1, wherein said determining the estimated positions of the moving object is performed based on a linear velocity of the moving object in one or more frames that precede a frame.

24. The method of claim 1, wherein said determining the estimated orientations of the moving object is performed based on a rotational velocity of the moving object in one or more frames that precede a frame.

25. A method for applying a combined irradiance attribute to a moving object, comprising:
  determining a plurality of estimated positions and a plurality of estimated orientations of the moving object in a game space for playing a game;
  sampling a first irradiance attribute imparted by a first light source to a portion of the moving object, the first irradiance attribute generated for one of the estimated positions and one of the estimated orientations;
  sampling a second irradiance attribute imparted by a second light source to the portion of the moving object, the second irradiance attribute generated for the one of the estimated positions and the one of the estimated orientations;
  determining that the moving object is at the one of the estimated positions and at the one of the estimated orientations during the play of the game;
  applying a statistical operation to the first irradiance attribute and the second irradiance attribute to generate the combined irradiance attribute for the one of the estimated positions and the one of the estimated orientations; and
  generating a rendered attribute for the portion of the moving object from the combined irradiance attribute when the moving object is at the one of the estimated positions and the one of the estimated orientations during the play of the game.

26. The method of claim 25, wherein said determining the estimated positions is performed for a frame that includes the game space, wherein said determining the estimated positions of the moving object is performed based on a linear velocity of the moving object in one or more frames that precede the frame.

27. The method of claim 25, wherein said determining the estimated orientations is performed for a frame that includes the game space, wherein said determining the estimated orientations of the moving object is performed based on a rotational velocity of the moving object in one or more frames that precede the frame.

28. The method of claim 25, further comprising:
  transferring the moving object from the game space into a light probe space, wherein said sampling the first irradiance attribute and said sampling the second irradiance is performed in the light probe space.

* * * * *